(12) United States Patent
Liljeback et al.

(10) Patent No.: US 11,544,052 B2
(45) Date of Patent: Jan. 3, 2023

(54) TENANT DECLARATIVE DEPLOYMENTS WITH RELEASE STAGGERING

(71) Applicant: salesforce.com, inc., San Francisco, CA (US)

(72) Inventors: Eric Liljeback, Burlington, MA (US); Derek Forrest, Burlington, MA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/399,467

(22) Filed: Aug. 11, 2021

(65) Prior Publication Data

US 2022/0050674 A1    Feb. 17, 2022

Related U.S. Application Data

(63) Continuation-in-part of application No. 16/995,380, filed on Aug. 17, 2020, now Pat. No. 11,281,452.

(51) Int. Cl.
*G06F 8/65*    (2018.01)
*G06F 9/48*    (2006.01)

(52) U.S. Cl.
CPC ............. *G06F 8/65* (2013.01); *G06F 9/4881* (2013.01)

(58) Field of Classification Search
CPC .................................. G06F 8/65; G06F 9/4881
See application file for complete search history.

(56) References Cited

U.S. PATENT DOCUMENTS

| | | | |
|---|---|---|---|
| 10,291,745 B2 * | 5/2019 | Staerk | G06Q 10/10 |
| 2012/0174085 A1 * | 7/2012 | Driesen | G06F 8/65 717/168 |
| 2015/0347542 A1 * | 12/2015 | Sullivan | G06F 16/2455 707/602 |
| 2016/0350098 A1 * | 12/2016 | Kuchibhotla | G06F 8/65 |

* cited by examiner

*Primary Examiner* — Phillip H Nguyen
(74) *Attorney, Agent, or Firm* — Holland & Hart LLP

(57) ABSTRACT

A method that includes identifying a declarative deployment file defining a deployment configuration for multiple logical single-tenant system stacks supported by a compute container system, where the deployment configuration includes a set of deployment criteria and a failure threshold. The method may further include determining, based on the set of deployment criteria, a set of deployment groups for implementing one or more system updates, where the set of deployment groups includes a first deployment group and the first deployment group includes a first set of logical single-tenant system stacks from the multiple logical single-tenant system stacks supported by the compute container system. The method may further include implementing the one or more system updates for the set of deployment groups based on the failure threshold.

20 Claims, 13 Drawing Sheets

TENANT DECLARATIVE DEPLOYMENTS WITH RELEASE STAGGERING

CROSS REFERENCES

The present Applications for Patent is a Continuation in Part of U.S. patent application Ser. No. 16/995,380 by Liljeback et al., entitled "TENANT DECLARATIVE DEPLOYMENTS," filed Aug. 17, 2020, assigned to the assignee hereof and expressly incorporated by reference herein.

FIELD OF TECHNOLOGY

The present disclosure relates generally to database systems and data processing, and more specifically to tenant declarative deployments with release staggering.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support services that can be implemented using a multi-tenant system. However, some services may be implemented using single-tenant systems on a public cloud. Single-tenant systems may provide improved data privacy and security, and may not be impacted by noisy neighbors (e.g., tenants that use significant computing resources, which may affect the performance of other tenants). For some single-tenant systems that support a large number of clients, deploying updates and upgrades may be difficult due to various geographical locations of clients, client activity patterns, or client preferences, among other examples.

DETAILED DESCRIPTION

Figure 1:
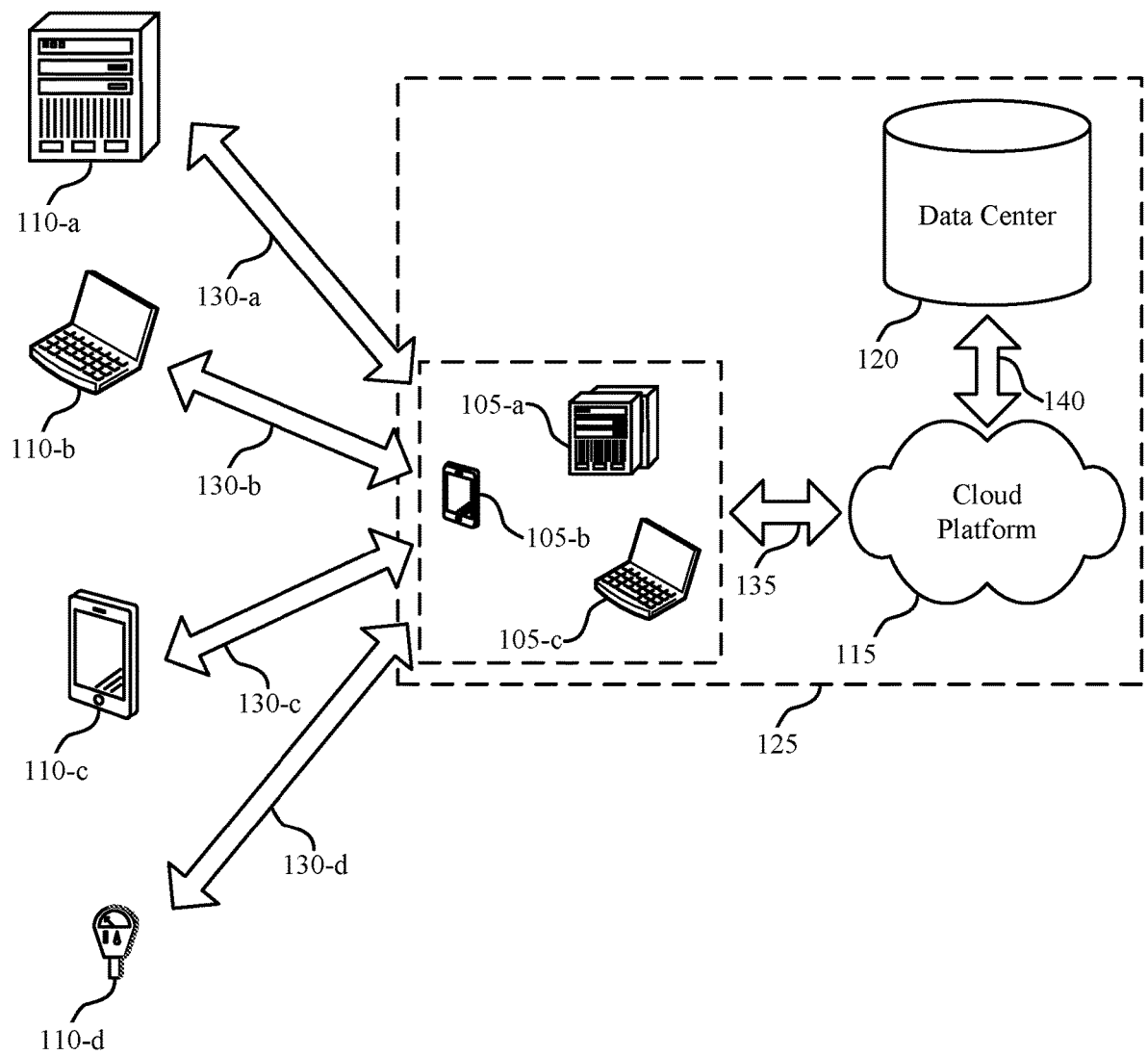
FIGS. 1-3 illustrate examples of software deployment systems that support tenant declarative deployments with release staggering in accordance with aspects of the present disclosure.

A cloud platform may support services that can be implemented using a multi-tenant system and services that can be implemented using single-tenant systems. Single-tenant systems may provide improved data privacy and security, and may not be impacted by noisy neighbors (e.g., tenants that use significant computing resources, which may affect the performance of other tenants). For some single-tenant systems that support a large number of clients, deploying updates and upgrades may be difficult due to various geographical locations of clients, client activity patterns, or client preferences, among other examples. For example, upgrading systems during periods of peak or high-volume customer traffic may cause service interruptions, which may result in customer dissatisfaction.

Aspects of the disclosure described herein support utilization of a declarative deployment file, which may also be referred to as a release train definition (RTD). The declarative deployment file may be read by a software extension, also referred to as a release manager or an operator, to schedule and implement software updates (e.g., deployments). A compute container system may be used to support various single-tenant systems, and the compute container system may support logical partitions for each of the single-tenant systems. These logical partitions may be referred to as logical single-tenant system stacks that include application servers, web servers, databases, or a combination thereof.

The declarative deployment file may include information such as maintenance windows for each tenant, blackouts or moratoriums, approved application and web versions for deployment, upgrade paths (e.g., prior version requirements), version prerequisites for different realms (e.g., tenant systems) and instances (e.g., logical single-tenant system stacks), or a combination thereof. The release manager software extension may read or reference the declarative deployment file to determine deployment schedules and implement upgrades for various systems and services at the logical single-tenant system stacks.

In some examples, the declarative deployment file may identify logical single-tenant system stacks using system identifiers from the declarative deployment file. The deployment manager or an associated system may maintain an association between the system identifiers, which may be associated with a specific tenant, and corresponding systems. These system identifiers may also be referred to as realm identifiers, and may be used to identify the physical and logical systems at which tenant services are hosted. In some examples, the deployment manager may also determine whether respective systems are running active processes before implementing system updates in accordance with the declarative deployment file.

The declarative deployment file may also specify a stagger configuration for deployment of one or more system updates. The stagger configuration may include grouping criteria and error detection criteria. The release manager software extension may use the grouping criteria in the stagger configuration to determine one or more stagger groups (e.g., deployment groups or batches) and a deployment schedule (e.g., an order) for the one or more stagger groups. Each stagger group may include logical single-tenant system stacks corresponding to different tenants. The release manager software extension may implement one or more system updates for the various stagger groups in accordance with the deployment schedule, and may use the error detection criteria to determine whether a deployment for a stagger group is a success or a failure. If, for example, the release manager software extension determines that a system update for a stagger group has failed, the release manager software extension may stop the system update and refrain from deploying the system update to other stagger groups. Using a staggered deployment release to implement system updates may reduce the frequency and severity of interruptions caused by failed system updates, and may improve the likelihood of successfully detecting and mitigating errors during a deployment process.

Aspects of the disclosure are initially described in the context of an environment supporting an on-demand database service. Aspects of the disclosure are illustrated by and described with reference to software deployment systems, deployment configurations, deployment processes, and process flows. Aspects of the disclosure are further illustrated by and described with reference to apparatus diagrams, system diagrams, and flowcharts that relate to tenant declarative deployments with release staggering.

FIG. 1 illustrates an example of a software deployment system 100 for cloud computing that supports tenant declarative deployments with release staggering in accordance with various aspects of the present disclosure. The software deployment system 100 may include cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, each cloud client 105 or a subset of the cloud clients 105 may be supported in a single-tenant environment. Single-tenant environments may provide improved data security, privacy, quality of service, and scalability, among other examples. These single-tenant environments may be implemented in public cloud systems. The single-tenant environments may be logically separated (e.g., logically self-contained within the same physical systems). Each single-tenant environment may be referred to as a logical single-tenant system stack. In some examples, the cloud platform 115 may support thousands of single-tenant cloud clients 105. As such, deploying updates and patches to the single-tenant system stacks may depend on a number of factors, such as preferred maintenance windows, active versions, traffic loads, or tenant preferences, among other examples.

In multi-tenant systems, tenants may share database rows, tables, physical and logical storage, or data processes, among other examples. Thus, in multi-tenant environments, system updates may affect multiple tenants contemporaneously. Specifically, because the multi-tenant system uses shared physical and logical systems, a system update may be pushed to all tenants at the same time. This may enable system operators to predictably and consistently deploy scheduled updates. Further, since the system is homogenous (e.g., tenants may be configured with the same active versions), version compatibility checks may be bypassed. Thus, the system updates may be efficient and streamlined, but may result in all tenant systems being offline (e.g., for maintenance) at the same time.

Techniques described herein may provide for efficient and streamlined software deployments in a single-tenant environment. Logical single-tenant system stacks (e.g., partitions) may be supported by a compute container system of a cloud platform. A deployment manager (e.g., software extension) of the computer container system may reference a declarative deployment file (e.g., an RTD) to implement software updates to one or more logical single-tenant system stacks. The declarative deployment file may include maintenance windows, software compatibility definitions, system identifiers (e.g., realm identifiers), and other information for deploying system updates to the tenant systems. Thus, the deployment manager may identify a deployment schedule for implementing the system updates in accordance with the declarative deployment file. Identifying the deployment schedule may include determining which logical single-tenant system stacks to update and at which times to deploy the system updates based on the maintenance windows defined in the declarative deployment files. Additionally, the declarative deployment file may include a staggered configuration defining deployment groups for deploying updates in addition to a failure threshold. The staggered configuration may be used to define groups or batches of logical single-tenant system stacks at which to deploy updates. These staggered deployment groups and failure thresholds may be used to limit errors during deployment of updates.

Further, as system updates are rolled-out (e.g., implemented), the deployment manager may automatically determine whether a service instance (e.g., tenant) is running an active process before deploying system updates to the service instance, which may result in fewer service interruptions for the tenant. Other techniques are described herein to support deploying updates to multiple logical single-tenant system stacks. The described techniques may improve computing, memory and processing efficiency when deploying system updates to large numbers of service instances. For example, the described techniques may prevent system updates from being deployed to a tenant during peak operating hours for the tenant, which may reduce service interruptions at the tenant. Additionally, aspects of the present disclosure may enable the operator to prevent updates from being deployed to service instances with unsupported active versions, which may reduce errors and processing inefficiencies.

It should be appreciated by a person skilled in the art that one or more aspects of the disclosure may be implemented in the software deployment system 100 to additionally or alternatively solve problems other than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, the cloud platform 115 may support a commerce system that includes a number of e-commerce services. The services may include product recommendation services, point of sale services, customer relationship services, or logistic services, among other examples. Tenants of the cloud platform 115 may prefer that these e-commerce services be provided in a single-tenant environment. These preferences may be due to single-tenant environments having improved data privacy, security, and reliability, among other examples. As such, the cloud platform 115 may support these services in single-tenant environments. In some examples, the cloud platform 115 may support these services for thousands of single-tenant environments. In such examples, the techniques described herein may provide for streamlined and automated deployment of system updates, which may result in reduced system downtime and improved processing efficiency, among other benefits. Further, the system updates may be deployed within a pre-defined maintenance window, which may be based on customer activity patterns for each single-tenant environment. Thus, system updates may be deployed in a manner that reduces service interruptions and improves overall customer experience.

Figure 2:
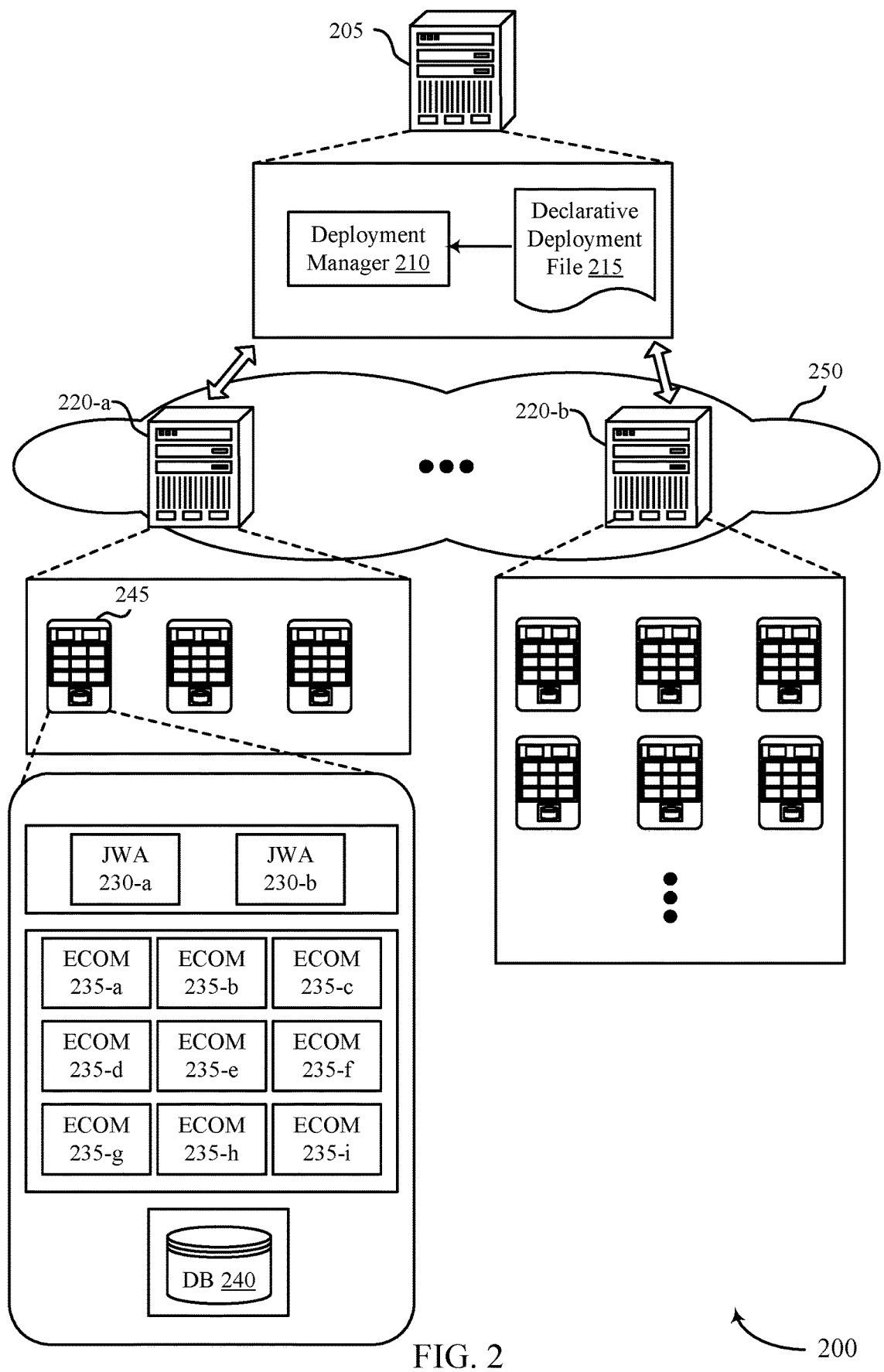

FIG. 2 illustrates an example of a software deployment system 200 that supports tenant declarative deployments with release staggering in accordance with aspects of the present disclosure. The software deployment system 200 may include a node 205, which may be an example of aspects of a cloud platform 115 described with reference to FIG. 1. The software deployment system 200 may also include a node 220-a and a node 220-b, which may also be examples of aspects of a cloud platform 115 described with reference to FIG. 1. The nodes 220 may be implemented in a public cloud 250. The nodes 220 may be examples of servers that are implemented in a web services solution provided by a third party. Although the nodes 220 are illustrated as single servers, it is to be understood that the nodes 220 may each include multiple physical servers, data storage systems, or other computing devices. The nodes 220 may be geographically separated or co-located (e.g., in the same physical location).

Each of the nodes 220 may represent a node of a compute container system, such as a Kubernetes system. That is, the nodes 220 may be examples of nodes that handle one or more computing containers in a Kubernetes system. The node 205 may represent a Kubernetes master node that communicates with the nodes 220 via an application programming interface (API) server. In some examples, a system manager may access the node 205 for various configurations or for system monitoring, among other examples. Each of the nodes 220 may manage logical single-tenant system stacks 245. Each of the logical single-tenant system stacks 245 may correspond to a tenant (e.g., a cloud client 105 described with reference to FIG. 1). The logical single-tenant system stacks 245 may be logical partitions of a Kubernetes cluster. The logical single-tenant system stacks 245 may be distributed among servers and nodes 220 based on data throughput at various geographical locations, tenant activity, customer activity, tenant locations, or customer locations, among other examples.

As described herein, a tenant (e.g., a cloud client 105) may prefer single-tenant environments for e-commerce services due to the security, privacy, and quality of service benefits associated with single-tenant environments. Thus, each of the logical single-tenant system stacks 245 may be a logically self-contained stack that can be run (e.g., executed) on shared physical blades, hosts, or virtual machines, among other examples. However, the logical single-tenant system stacks 245 may maintain separate processing stacks, such as web tiers, table space, oracle processes, application servers, web servers, or load balancers, among other examples. Accordingly, each tenant may be independently scaled to support varying traffic levels. As illustrated in FIG. 2, a logical single-tenant system stack 245 may include a set of application servers 235, which may be examples of single-tenant application servers that support tenant websites (e.g., storefronts). These application servers 235 may support various services for tenants. Further, the logical single-tenant system stack 245 may include a set of web servers 230, which may support ingress and caching for tenant websites (e.g., storefronts). The logical single-tenant system stack 245 may also include a database 240 (e.g., a database instance).

Techniques described herein may provide for deployment management using a declarative deployment file 215. The declarative deployment file 215 may define a "desired state" along with various update configurations for deployment of updates to the various nodes 220 of the software deployment system 200. In some examples, the declarative deployment file 215 may be defined via a Kubernetes Custom Resource definition and may be managed using a custom resource (e.g., a custom Kubernetes API endpoint). A Kubernetes custom resource may support storage and retrieval of structured data. In some examples, the declarative deployment file 215 may function as a declarative API defining a desired state of the Kubernetes system. The declarative deployment file 215 may include indications of system identifiers (e.g., realm identifiers), which may correspond to the logical single-tenant system stacks 245 that are to receive a system update. The declarative deployment file 215 may also include indications of maintenance windows for these system updates. For example, some tenants may prefer that system updates are applied during periods of low customer activity. Thus, these maintenance windows may be based on customer or tenant preferences. The declarative deployment file 215 may also define blackouts or moratoriums, during which various services may be inaccessible. In some examples, the declarative deployment file 215 may indicate approved application and web server versions to be deployed, approved upgrade paths, and version prerequisites for different realms or instances. In some examples, the declarative deployment file 215 may include an identifier of a Docker image that indicates the information for system updates.

When the declarative deployment file 215 is merged, the declarative deployment file 215 may be distributed to each of the nodes 220 based on which nodes 220 manage tenant systems specified in the declarative deployment file 215 by the deployment manager 210. In some cases, the declarative deployment file 215 may be packaged as a Kubernetes helm chart, or may be distributed (e.g., published) to the nodes 220 via an endpoint, such as an Amazon S3 bucket. In some examples, the deployment manager 210 may generate Spinnaker pipelines for distribution of the declarative deployment file 215, as described with reference to FIG. 5.

Each of the nodes 220 may include a deployment component, which may be referred to as an operator or a Kubernetes software extension. The operator may reference the declarative deployment file 215 to determine a deployment schedule for the nodes 220. The deployment schedule may be dependent on the maintenance windows or the respective logical single-tenant system stacks 245 that each of the nodes 220 services, among other examples. Further, when a logical single-tenant system stack 245 is being upgraded, the operator may determine whether the respective systems (e.g., the application servers 235) are running an active process before deploying the system update. The described techniques may support dynamic upgrades to various logical single-tenant system stacks 245 in a manner that reduces downtime, ensures that various constraints are satisfied, and reduces errors. As each of the nodes 220 may separately deploy system updates, the logical single-tenant system stacks 245 for each of the nodes 220 may be upgraded in a manner that does not interfere with services at other nodes 220 supporting logical single-tenant system stacks 245 for the same tenants.

Various types of updates may be implemented and configured by the declarative deployment file 215. For example, the declarative deployment file 215 may implement one or more migration updates that result in server downtime. That is, a migration update may stop a service instance, update binaries at the service instance, perform database migrations, and restart the service instance. In contrast, a hotfix update may be less disruptive than a migration update. A hotfix update may stop a service instance, update binaries at the service instance, and restart the service instance. Likewise, a patch update may not be disruptive and may patch partial jars available in a directory from which the system class path is built, and may perform a rolling restart of app servers at the service instance. In some examples, the declarative deployment file 215 may indicate the type of update. In such examples, the determined deployment schedule may depend on the update type. For a migration, the operator may push the update during an indicated maintenance window. For a patch, the operator may push the update at any time or when the service instance is not actively running a process.

Each of the logical single-tenant system stacks 245 may include multiple service instances, such as a test instance or a production instance. A test instance (e.g., a sandbox) may be used by tenants to test various services using systems from the logical single-tenant system stacks 245. A production instance may support live services such as live web and app servers. Various updates may be pushed to test instances before pushing to production instance, such that tenants may test the updated systems prior to implementing the updates for live services. In some examples, the declarative deployment file 215 may indicate which instances (e.g., test or production) are to be updated. Accordingly, the operator may determine a deployment schedule based on this indication. Since a test instance may not experience any downtime, the operator may push updates to test instances outside of a maintenance window.

In some examples, a repository for the declarative deployment file 215 may be validated to ensure that the declarative deployment file 215 includes proper structure and content for implementation of system updates. These validations may be orchestrated via hooks to ensure that a comment message has a valid change case identifier in an approved status. The hook may ensure a successful validation build. In some examples, the validation build may be automatically run via a multibranch pipeline job. The hook may check whether the file adheres to a defined schema, whether the instance reference in the file exists, whether the realms exist, whether the target versions (e.g., web and app servers) have been released (e.g., via an API), whether images of the referenced target versions have been published (e.g., via an API). The hooks may also check whether a valid upgrade is within a start window. The check may fail if a 'from' date is past a specific date (e.g., 90 days or less). The hooks may also verify whether regular expressions are valid. If these checks are successful, a pull request may be merged to the master branch, which may trigger deployment of the declarative deployment file 215 to the nodes 220.

In some examples, an operator for each of the nodes 220 may maintain a last known good software version (e.g., a software version that is successfully installed an executed) for each service instance (e.g., the web servers 230, the application servers 235, or the database 240) in case a failure occurs during update deployment. For example, if a system update fails (e.g., due to an error condition), the operator may roll-back an update to the last known good version. Thus, the operator may maintain the last known good version for each logical single-tenant system stack 245 (e.g., for each tenant) rather than maintaining a last known good version for each of the nodes 220. This may ensure that roll-backs are performed correctly when error conditions are detected.

Figure 3:
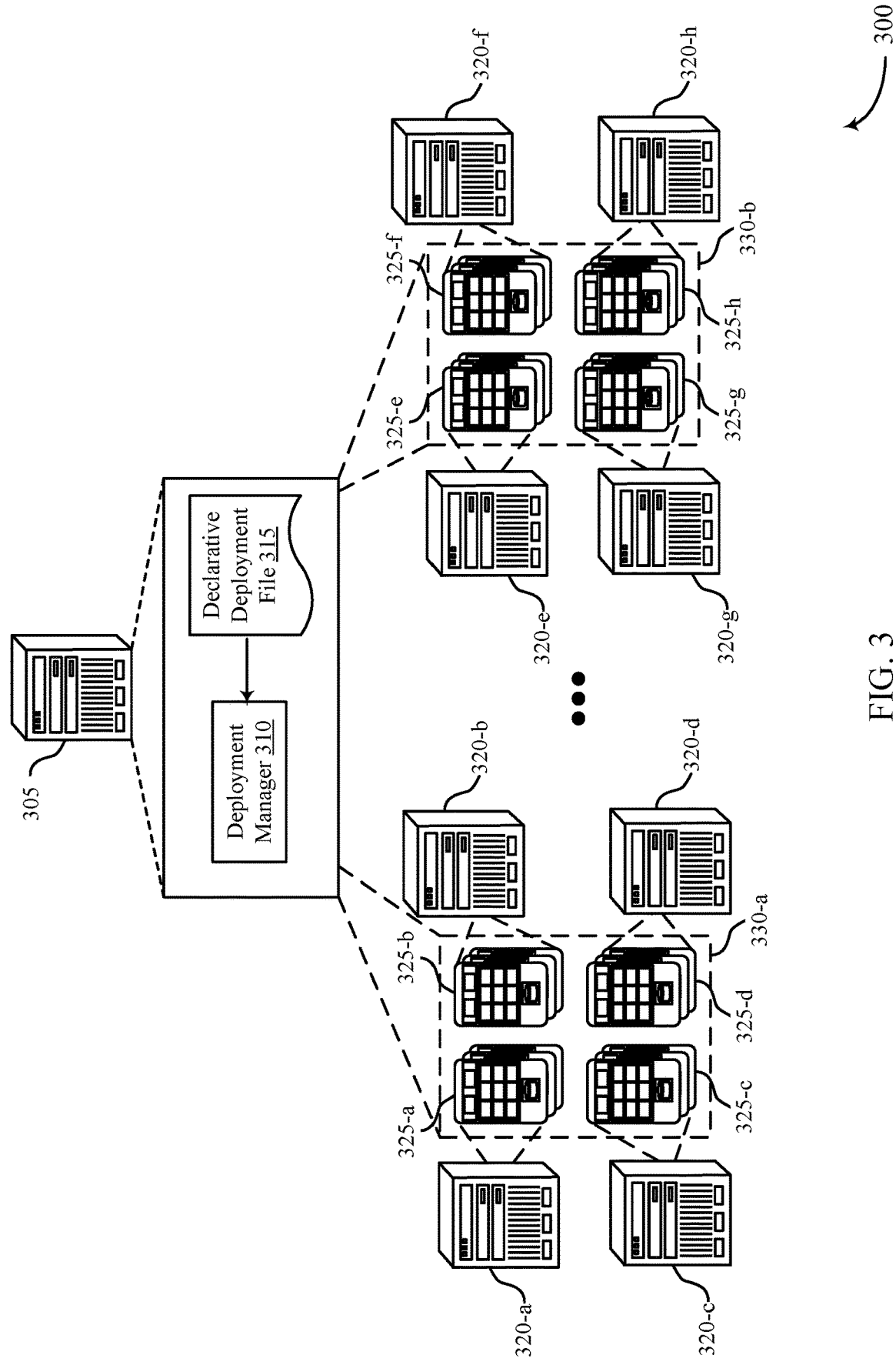

FIG. 3 illustrates an example of a software deployment system 300 that supports tenant declarative deployments with release staggering in accordance with aspects of the present disclosure. The software deployment system 300 may implement or be implemented by aspects of the software deployment system 100 or the software deployment system 200. For example, the software deployment system 300 may include a node 305, a deployment manager 310, and a declarative deployment file 315, which may be examples of corresponding aspects described with reference to FIG. 2. The software deployment system 300 may also include nodes 320 and logical single-tenant system stacks 325, which may be examples of nodes 220 and logical single-tenant system stacks 245 described with reference to FIG. 2. Each node 320 may represent or correspond to one or more logical single-tenant system stacks 325 for a particular tenant. Thus, each logical single-tenant system stack 325 of a node 320 may be supported by geographically separate physical components, and as such, a node 320 may represent various separate physical computing components.

In the example of FIG. 3, the node 305 (e.g., a Kubernetes master node) may identify a declarative deployment file 315 that defines a deployment configuration for one or more system updates to be implemented at the nodes 320. The deployment manager 310 (e.g., a release operator) may determine one or more deployment groups 330 based on the declarative deployment file 315. The deployment groups 330 may include various logical single-tenant system stacks 325 associated with the nodes 320. For example, a deployment group 330-a may include logical single-tenant system stacks 325-a associated with a node 320-a, logical single-tenant system stacks 325-b associated with a node 320-b, logical single-tenant system stacks 325-c associated with a node 320-c, logical single-tenant system stacks 325-c associated with a node 320-c, and logical single-tenant system stacks 325-d associated with a node 320-d. Likewise, a deployment group 330-b may include logical single-tenant system stacks 325-e associated with a node 320-e, logical single-tenant system stacks 325-f associated with a node 320-f, logical single-tenant system stacks 325-g associated with a node 320-g, and logical single-tenant system stacks 325-h associated with a node 320-h. In some examples, each of the nodes 320 may correspond to a different tenant supported by a compute container system, as described with reference to FIGS. 1 and 2. In other examples each of the nodes 320 may support multiple tenants. That is, each logical single-tenant system stack 325 associated with a particular node 320 may be associated with a separate tenant.

To ensure a safe and controlled rollout of deployments across the nodes 320 (e.g., Kubernetes clusters), to assess any negative impact of a system update, and to prevent further deployment rollout until such impacts are mitigated, a deployment freeze indicator may be used to prevent a deployment from proceeding when an error is detected. That is, when a deployment freeze indicator is detected, the deployment freeze indicator may prevent a specific version (e.g., system update) from continuing to be deployed until the deployment freeze indicator is cleared. In some examples, the deployment manager 310 may use a controlled rollout across service instances (e.g., the logical single-tenant system stacks 325) and a native Kubernetes rollout strategy to control a rollout within a service instance. For some single-tenant environments (e.g., single-tenant environments supporting e-commerce services), the deployment manager 310 may use additional levels of abstraction for staggering releases, which may help prevent further deployment failures if the deployment manager 310 detects problems early in a rollout.

In some software deployment systems, the deployment manager 310 may update the declarative deployment file 315 (e.g., an RTD) and annotations on various resources. Updating these annotations may trigger a reconcile function in the deployment manager 310, which may help determine whether a given service instance is to be updated. If the service instance is to be updated, the deployment manager 310 may update the service instance with a software version specified in the declarative deployment file 315. If the service instance is to be updated at a later time, the deployment manager 310 may reschedule the reconcile for a subsequent time. If, for example, the reconcile function notes that either a web component or an application component of the service instance is to be upgraded, the deployment manager 310 may upgrade this component by updating the image and version on corresponding resources. At this point, the deployment manager 310 may exit and an application server operator or a web server operator may reconcile versions and perform the upgrade.

In some cases, however, rolling out a deployment from the deployment manager 310 may effectively update all service instances at one time, and may rely on the application server operator to throttle upgrades based on infrastructure-level constraints. If, for example, a deployment fails, the deployment may continue on with the rest of the cluster until an attempt has been made to upgrade all instances, or until there is some sort of manual intervention. In some cases, if an error propagates throughout a large number of service instances, the error may lead to a cluster-wide outage.

To improve the deployment process, the deployment manager 310 may define a canary group (e.g., that includes one or more logical single-tenant system stacks 325) to be updated prior to other deployment groups. Additionally or alternatively, the deployment manager 310 may define one or more stagger groups and may stop a deployment within a service instance if deployment to a canary group fails. Similarly, the deployment manager 310 may stop a deployment within a service instance if a deployment within a stagger group fails. In some examples, the deployment manager 310 may determine stagger group constraints using current filtering capabilities, such as realms, instances, or types of the logical single-tenant system stacks 325. Further, the deployment manager 310 may stop a deployment across multiple service instances (e.g., Kubernetes clusters) or within a stagger group if one deployment in the stagger group fails. In some examples, the stagger group may finish the deployment to completion, even if a deployment within the group fails.

The deployment manager 310 may use a canary process, a stagger process, or both to deploy system updates for the deployment groups 330. In some examples, if the declarative deployment file 315 is updated, the update may trigger a reconcile function for the declarative deployment file 315 at the deployment manager 310. This function may determine if a specific component is scheduled to be updated. If the component is not scheduled for an update, the deployment manager 310 may re-queue the reconcile function. Alternatively, if the component is scheduled (e.g., available) to be updated, the deployment manager 310 may filter service instances based on deployment criteria in the declarative deployment file 315.

If the declarative deployment file 315 indicates a stagger configuration, the deployment manager 310 may filter the logical single-tenant system stacks 325 into deployment groups 330 (e.g., stagger groups). The deployment groups 330 may be ordered based on ordinal values of the deployment groups 330 in a stagger group array. In some examples, a size parameter from the declarative deployment file 315 (e.g., batchSize) may control how many tenants (e.g., nodes 320) are in each of the deployment groups 330. In the same or alternative examples, the size parameter from the declarative deployment file (e.g., batchSize) may control how many logical single-tenant system stacks 325 are in each of the deployment groups 330. For a sandbox instance group (SIG), a tenant may be an example of a single sandbox instance. For a primary instance group (PIG), a tenant may include a production instance, a staging instance, and a development instance. By default, the deployment groups 330 may be constructed in alphabetical order with respect to realm or instance. In some examples, stagger group instances may be filtered from instances available from a top-level configuration.

Accordingly, the deployment manager 310 may update a version of the declarative deployment file 315 on resources corresponding to the logical single-tenant system stacks 325 in the deployment group 330-a (e.g., the first stagger group). If all instances in the deployment group 330-a already have the latest version of the declarative deployment file 315 and a last known good version for the instances in the deployment group 330-a match a target version (e.g., due to the update being successful and the last known good version being updated) of the declarative deployment file 315, the deployment manager 310 may proceed to the deployment group 330-b (e.g., the next stagger group). The deployment manager 310 may then wait for all resources in the deployment group 330-b to have a last known good version (e.g., for application components or web components) set to the target version. This may indicate that the deployment group 330-b has successfully updated.

If a deployment within the deployment group 330-b fails and a stoppage parameter (e.g., stopOnFailure) from the declarative deployment file 315 is set to a specific value (e.g., true) and an error threshold parameter (e.g., error ThresholdPercentage) for the deployment group 330-b is met or exceeded, the deployment manager 310 may generate a deployment freeze. In such examples, deployments within the deployment group 330-b may run to completion (e.g., either success or failure), but the next deployment group may not start. Additionally or alternatively, if a deployment to the deployment group 330-b exceeds a maximum duration parameter (e.g., maxTimeInMinutes) from the declarative deployment file 315, the deployment manager 310 may create a deployment freeze. In contrast, if the deployment group 330-b completes successfully (e.g., as indicated by the last known good version of the declarative deployment file 315 matching a target version of the declarative deployment file 315 on all instances in the deployment group 330-b), the deployment manager 310 may proceed to the next stagger group. After successful completion of the final stagger group, the deployment manager 310 may update all instances that match the constraints for the component version not already included in a stagger group.

In some examples, the deployment manager 310 may periodically transmit polling messages to the logical single-tenant system stacks 325 in the deployment groups 330. Accordingly the logical single-tenant system stacks 325 in the deployment groups 330 may transmit notifications (e.g., annotations) to the deployment manager 310. The deployment manager may use these notifications to determine whether a system update has been successfully deployed to the deployment groups 330. Specifically, the deployment manager 310 may search for annotations that indicate a failed deployment within the deployment groups 330, annotations that indicate a maximum time threshold (e.g., max-TimeInMinutes) has been exceeded for a deployment, or annotations that indicate a completed stagger group deployment. To improve resiliency across release operator restarts, stagger group handling may be idempotent and emit status indicators as it progresses. These status indicators may be read by the deployment manager 310 across multiple reconcile invocations. The deployment manager 310 may be configured with a polling interval (e.g., deploymentStatus-Polling) to be used for re-queuing the reconcile after each poll. The reconcile may be re-queued until the deployment is complete (e.g., success or failure) or until a maintenance window expires.

To detect a failed deployment within the deployment groups 330, the deployment manager 310 may search for specific annotations from service instances with values set to the target version. To detect whether a maximum runtime of a stagger group has been exceeded, the deployment manager 310 may set an annotation on the declarative deployment file 315 with an epoch time at which deployment began for the stagger group. This annotation may contain the target version for the declarative deployment file 315 and may be used across reconciles (e.g., to track deployment runtime). After the stagger group is complete, the annotation may be modified. To detect whether a stagger group has finished successfully, the deployment manager 310 may compare a last known good version of the declarative deployment file 315 to the target version of the declarative deployment file 315. If all instances in the stagger group have a last known good version of the declarative deployment file 315 matching the target version of the declarative deployment file 315, the deployment may be considered a success, and the deployment manager 310 may proceed to the next stagger group.

In some examples, to support deployment freezes, the deployment manager 310 may set an annotation on the declarative deployment file 315 to indicate that a deployment problem has occurred. This annotation may be set at a component level, and may freeze (e.g., stop) all deployments for that component until the deployment freeze has been manually resolved. The annotation may be set to a version of the declarative deployment file 315 that caused the freeze to occur. The deployment manager 310 may process this annotation after every reconcile, and may determine whether to implement a deployment for the specific component based on processing the annotation. In other examples, deployment freezes may be supported for a specific version of a component. To clear the deployment freeze, the deployment manager 310 (or a network administrator) may remove the annotation. Clearing the freeze annotation may trigger the declarative deployment file 315 to reconcile again and restart from where the deployment had stopped (e.g., if a maintenance window is still active). In some examples, to support deployment freezes, a Spinnaker pipeline used for upgrade deployment may refrain from clearing any annotations when patching the declarative deployment file 315.

In other examples, a new custom resource (e.g., DeploymentFreeze) may be configured to support deployment freezes. This custom resource may be located in a specific namespace (e.g., operators-namespace). When the deployment manager 310 reconciles the declarative deployment file 315, the deployment manager 310 may search for any deployment freezes and may use the metadata within deployment freeze annotations to determine whether to deploy system updates. The custom resource may include an identifier field, a component field, a version field, a timestamp field, a message field, or a combination thereof. When the deployment manager 310 reconciles the declarative deployment file 315 and finds any deployment freezes for a component, the deployment manager 310 may refrain from deploying to that component until the deployment freeze has been cleared. Additionally, the deployment manager 310 may be configured to reconcile the declarative deployment file 315 when a deployment freeze is created, modified, or deleted. This may re-trigger a reconciliation of the latest declarative deployment file 315 such that clearing a deployment freeze restarts any deployments that were previously blocked. Clearing the deployment freeze may be done by breaking glass or using one or more processes to remove deployment freezes. Using a custom resource may provide more information about why a deployment freeze was created, and may be easier for the deployment manager 310 to read. Additionally, a grid-wide deployment freeze may be generated based on creating an instance of a custom resource in all clusters. Removal of the deployment freeze may also be easily automated via a control plane.

Figure 4:
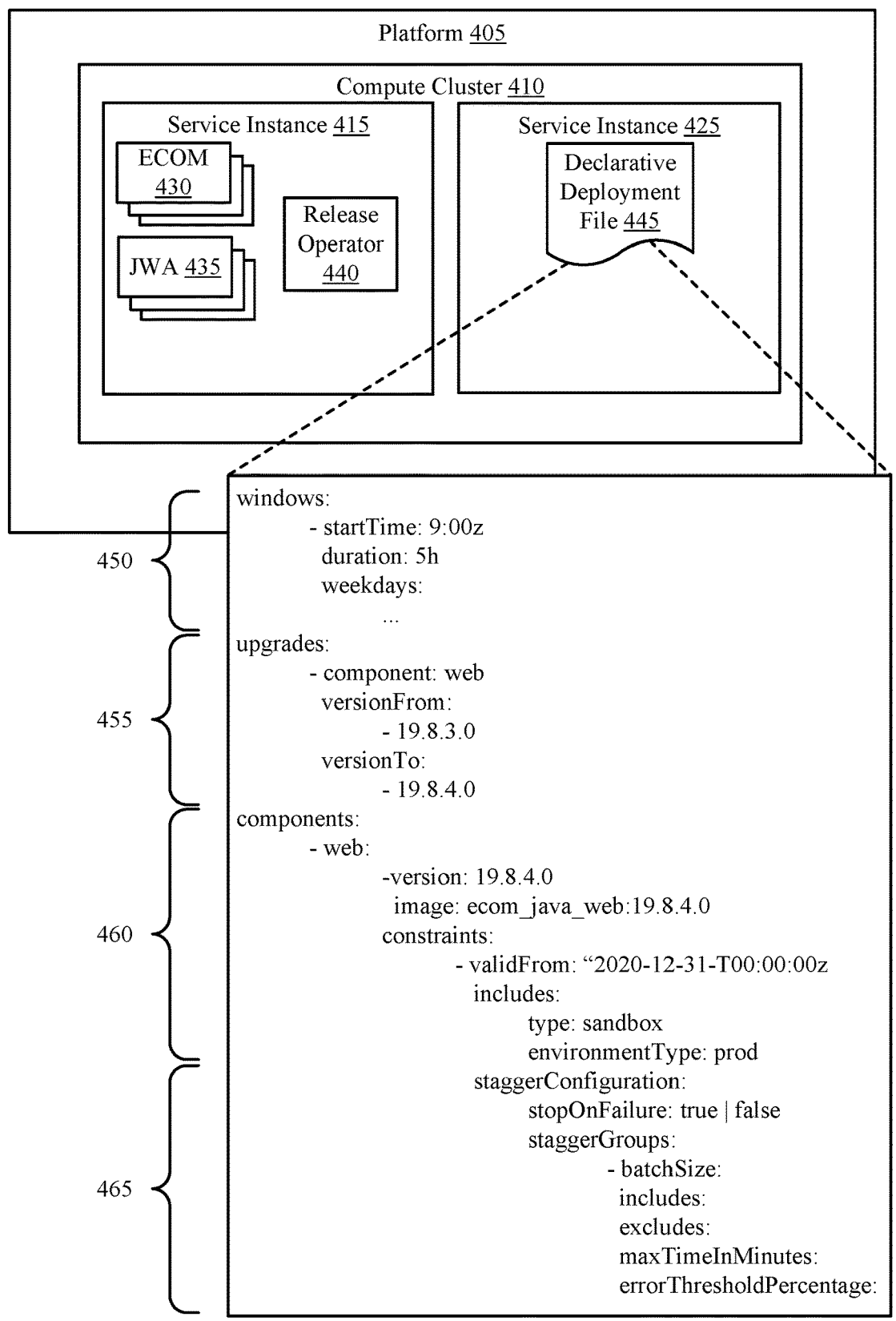
FIG. 4 illustrates an example of a deployment configuration that supports tenant declarative deployments with release staggering in accordance with aspects of the present disclosure.

FIG. 4 illustrates an example of a deployment configuration 400 that supports tenant declarative deployments with release staggering in accordance with aspects of the present disclosure. The deployment configuration 400 may implement or be implemented by aspects of the software deployment system 100, the software deployment system 200, or the software deployment system 300. For example, the deployment configuration 400 may include a platform 405, which may be an example of a cloud platform 115 described with reference to FIG. 1. The platform 405 may support various services and systems described herein, such as a compute cluster system or a logical single-tenant system stack, among other examples. The platform 405 may also support a compute cluster 410. The compute cluster 410 may be an example of a node 220 (e.g., a Kubernetes node) described with reference to FIG. 2.

The compute cluster 410 may be managed by a compute cluster management system, such as a master node (e.g., a node 205 described with reference to FIG. 2). The compute cluster 410 may support a service instance 415 and a service instance 425, which may support various pipeline configurations. For example, the service instance 425 may support a declarative deployment file 445, which may be an example of a declarative deployment file 215 described with reference to FIG. 2. The declarative deployment file 445 may provide pipeline isolation from other infrastructure components, which may enable the declarative deployment file 445 to be deployed irrespective of changes to other portions of the compute cluster 410. In other words, the service instance 425 may support distribution of the declarative deployment file 445 using a unique path (e.g., a unique set of Spinnaker pipelines).

As illustrated in FIG. 4, the declarative deployment file 445 may specify constraints and deployment parameters that can be used by a release operator 440 to determine a deployment schedule and implement updates for various systems (e.g., application servers 430 and web servers 435) of the compute cluster 410 in accordance with the declarative deployment file 445. At 450, the declarative deployment file 445 may define windows for deploying a system update. For example, the system update may be scheduled to start at 9:00 am on weekdays, and may have a duration of 5 hours. At 455, the system updates may be defined. In the example of FIG. 4, web server components (e.g., the web servers 435) may be upgraded from version 19.8.3.0 to version 19.8.4.0. In some examples, the release operator 440 may determine whether the web servers 435 are running on version 19.8.3.0 (or later) prior to deploying the system update. At 460, the declarative deployment file 445 may define a version of the system update and may also provide a reference to an image location for the system update. Further constraints, such as a validity date, a time, or a realm (system identifier) may also be defined. In some examples, only some realms (e.g., logical single-tenant system stacks associated with some tenants) may be updated. In other examples, the declarative deployment file 445 may indicate tenant groups, which may enable deployment of system updates to different tenant groups. Tenant groups may be specified using metadata associated with the tenants. This metadata may be stored as Kubernetes metadata and may be defined in a tenant definition file, a custom resource, or in some other central metadata mapping service. Thus, rather than referencing each tenant for deployment of a system update, the declarative deployment file 445 may reference a group of tenants.

At 465, the declarative deployment file 445 may define one or more fields that relate to staggered deployment releases, as described with reference to FIG. 3. For example, the declarative deployment file 445 may define a stoppage field (e.g., staggerConfiguration.stopOnFailure) that determines behavior of the release operator 440 when a deployment failure occurs during a canary or stagger process. If the stoppage field is set to a first Boolean value (e.g., true), the release operator 440 may stop deploying a target version of the declarative deployment file 445 to a compute cluster 410 upon detecting a deployment failure. Alternatively, if the stoppage field is set to a second Boolean value (e.g., false), the release operator 440 may continue deploying a target version of the declarative deployment file 445 to the compute cluster 410 upon a deployment failure.

The declarative deployment file 445 may also define a batch size field (e.g., staggerConfiguration.staggerGroups.batchSize) for deploying updates to the compute cluster 410. The batch size field may determine a number of service instances to include in a stagger group. For SIGs, a tenant may include a sandbox instance. For PIGs, a tenant may include a production instance, a staging instance, and a development instance. If the number of service instances is smaller than a number of service instances matching canary constraints, the release operator 440 may select available service instances in alphabetical realm order. If the number of service instances is larger than the number of service instances matching canary constraints, the release operator 440 may select additional canary instances in alphabetical order.

Additionally, the declarative deployment file 445 may specify an inclusion field (e.g., staggerConfiguration.staggerGroups.includes), which may include criteria for selecting service instances to include in various stagger groups. The inclusion criteria may include a realm criterion, a service instance criterion, or an environment type criterion, among other examples. Similarly, the declarative deployment file 445 may specify an exclusion field (e.g., staggerConfiguration.staggerGroups.excludes), which may include criteria for selecting service instances to exclude from various stagger groups. The exclusion criteria may include a realm criterion, a service instance criterion, or an environment type criterion, similar to the inclusion criteria.

The declarative deployment file 445 may also include a maximum time duration field (e.g., staggerConfiguration.staggerGroups.maxTimeInMinutes) corresponding to a maximum amount of time (e.g., in minutes) for a deployment. If the maximum time duration is exceeded, the deployment may be treated as a failure. In some examples, if the maximum time duration field is set to zero, the release operator 440 may determine that there is no maximum time duration for a deployment.

In addition, the declarative deployment file 445 may specify a failure threshold field (e.g., staggerConfiguration.staggerGroupsfailureThresholdPercentage), which may represent a maximum percentage of service instances within a stagger group that can fail before the deployment is stopped and the stagger group is considered a failure. If the stoppage field is set to the first Boolean value (e.g., true) and the failure threshold is exceeded, the deployment may not progress beyond the current stagger group, and the release operator 440 may generate a deployment freeze for the deployment. For SIGs, a failure may correspond to a deployment failure at one sandbox instance. For PIGs, a failure may be defined as one or more failures at service instances in the PIG. Failures may be calculated using a preconfigured equation (e.g., failedInstances/batchSize=failurePercentage). In other examples, if the stoppage field is set to the second Boolean value (e.g., false), the failure threshold field may be ignored by the release operator 440. The failure threshold field may be set to 0 by default. In such examples, a single failed deployment may result in creation of a deployment freeze.

The release operator 440 may also identify an upgrade type (e.g., patch, migration, hotfix) and may use the identified upgrade type to determine whether to perform various functions, such as implementing the upgrade in a maintenance window (e.g., for an upgrade that brings service instances offline) or implementing the upgrade at some other time (e.g., for a patch). The release operator 440 may infer the upgrade type by comparing source and target versions for the system update.

It should be understood that the declarative deployment file 445 may have a format that is different from the format illustrated in FIG. 4. Moreover, the declarative deployment file 445 may include additional information, such as identification information for different service instances. This information may indicate whether an upgrade is to be deployed to a test instance (e.g., a sandbox) or a production instance. If the upgrade is to be deployed at a test instance, a tenant (or a user associated with the tenant) may be able to test various services using the test instance. In some examples, the release operator 440 may receive different declarative deployment files for different nodes, and may read these declarative deployment files to determine which service instances to upgrade.

In some cases, a user interface may be used to configure the declarative deployment file 445. For example, a release management user may select various identifiers, software versions, or maintenance windows using a user interface. Accordingly, the declarative deployment file 445 may be generated based on selections by the release management user at the user interface.

Figure 5:
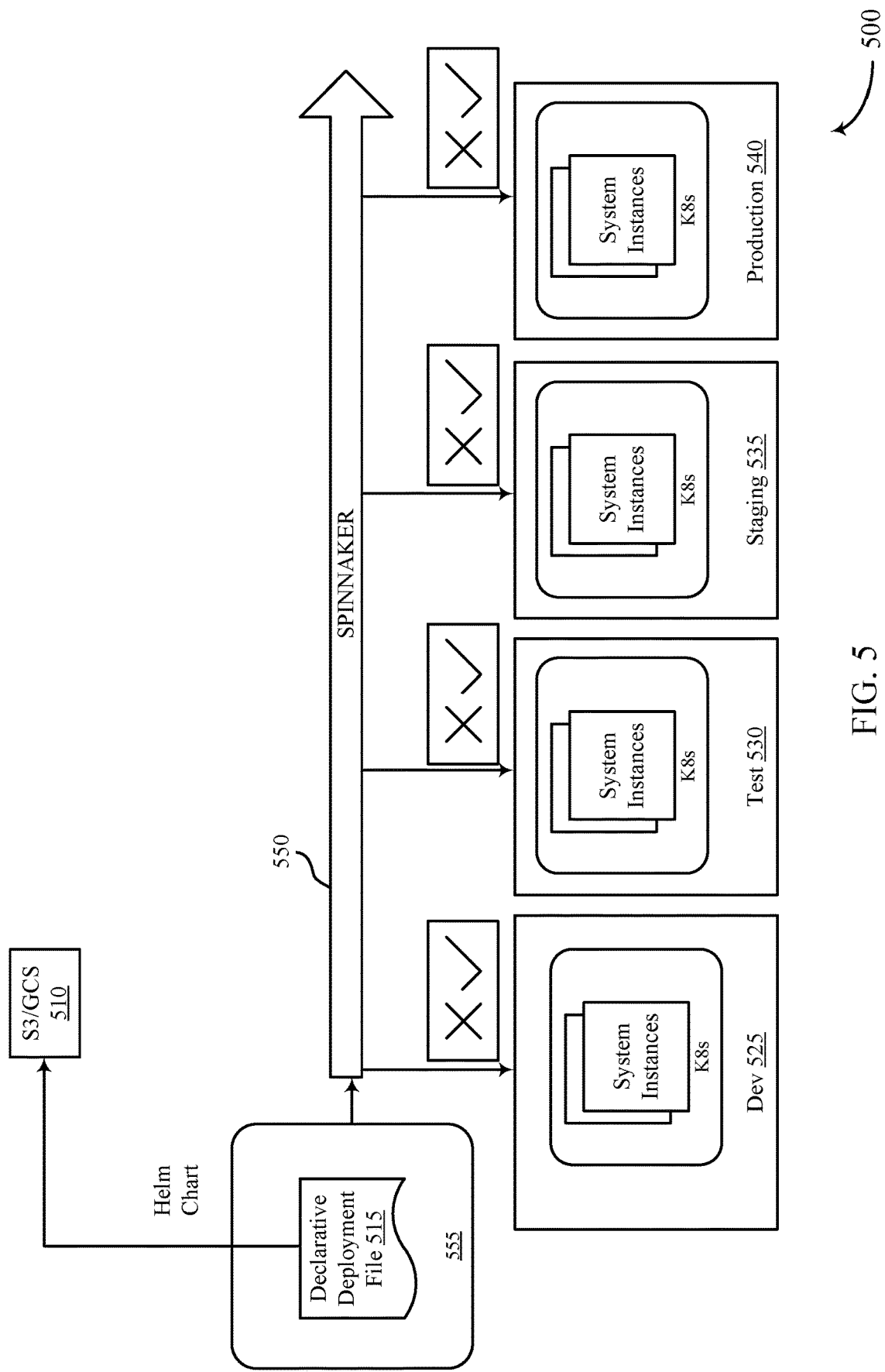
FIG. 5 illustrates an example of a deployment process that supports tenant declarative deployments with release staggering in accordance with aspects of the present disclosure.

FIG. 5 illustrates an example of a deployment process 500 that supports tenant declarative deployments with release staggering in accordance with aspects of the present disclosure. The deployment process 500 may illustrate aspects that relate to deploying a declarative deployment file 515. The deployment process 500 may include a node 555, which may be an example of a node 205 (e.g., a Kubernetes master node) described with reference to FIG. 2. A release management user may configure the declarative deployment file 515, which may be an example of a declarative deployment file 215, a declarative deployment file 315, or a declarative deployment file 445 described with reference to FIGS. 2-4.

When an updated declarative deployment file 515 is merged, it may be converted to a helm chart or published to an Amazon S3 or Google cloud storage bucket 510. However, it is to be understood that other object storage services may also be used. In some cases, a manifest file may be referenced to identify which systems are to receive the declarative deployment file 515. The declarative deployment file 515 may be pushed to different compute clusters via a pipeline 550, which may be an example of a Spinnaker pipeline. The pipeline 550 may identify which systems, clusters, or nodes are to receive the declarative deployment file 515. The pipeline 550 may also push the declarative deployment file 515 through a deployment process. Specifically, the pipeline 550 may patch and update existing declarative deployment files for clusters that are to receive the updated declarative deployment file 515.

The pipeline 550 may push the declarative deployment file 515 through various environments such as a development environment 525, a test environment 530, a staging environment 535, or a production environment 540. At each stage, the pipeline 550 may confirm that existing declarative deployment files have been patched or updated correctly.

If a node receives the declarative deployment file 515, a release operator for the node may read the declarative deployment file 515 and configure relevant web servers and application servers to a desired state based on the declarative deployment file 515. As the release operator deploys updates, the release operator may perform error detection for the system updates, as described with reference to FIGS. 3 and 4.

Figure 6:
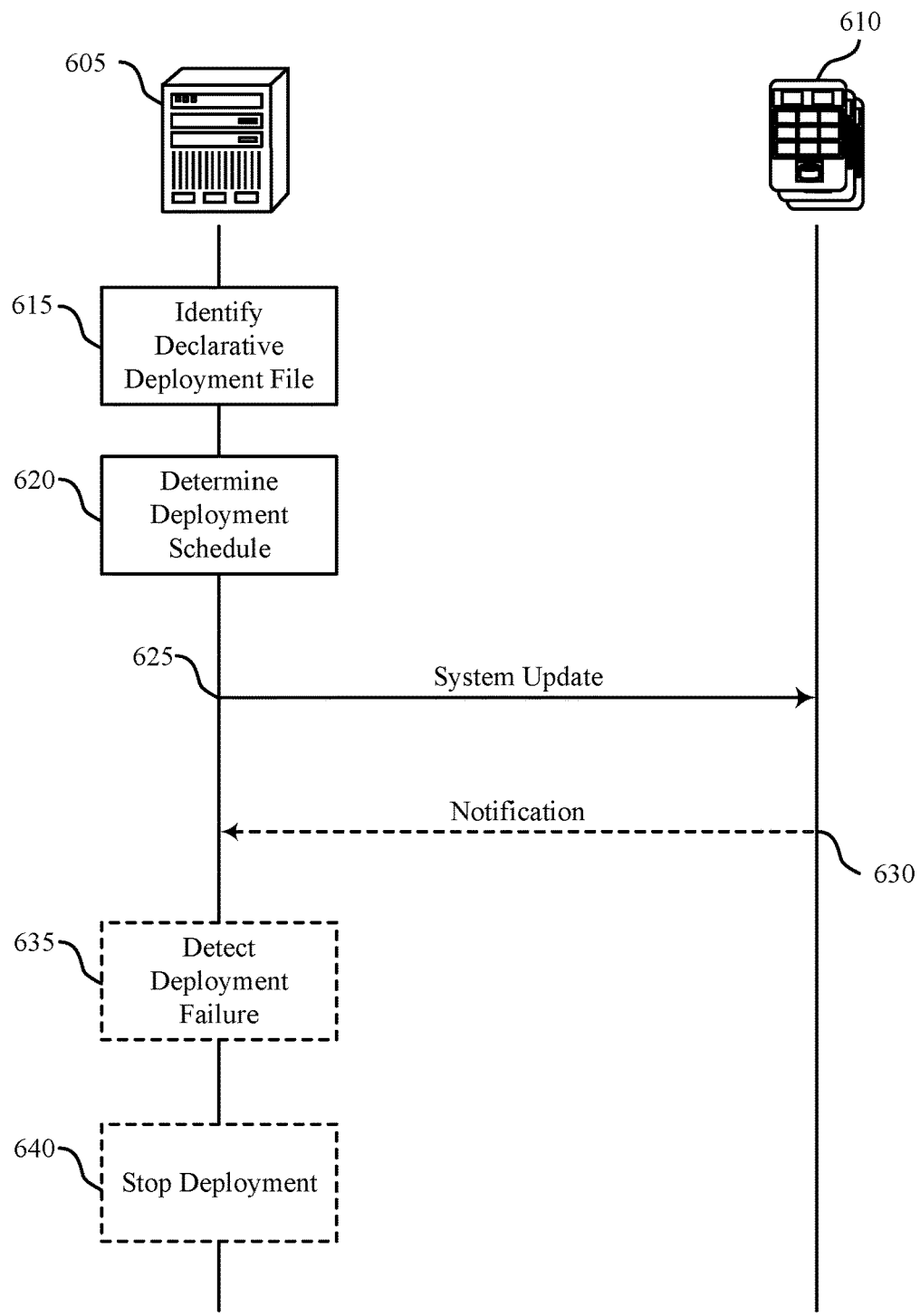
FIG. 6 illustrates an example of a process flow that supports tenant declarative deployments with release staggering in accordance with aspects of the present disclosure.

FIG. 6 illustrates an example of a process flow 600 that supports tenant declarative deployments with release staggering in accordance with aspects of the present disclosure. The process flow 600 may implement or be implemented by aspects of the software deployment system 100, the software deployment system 200, or the software deployment system 300. For example, the process flow 600 may include a node 605 and a deployment group 610, which may be examples of a node 205 and a deployment group 330 as described with reference to FIGS. 2 and 3. In some examples, the deployment group 610 may include one or more logical single-tenant system stacks, which may be examples of logical single-tenant system stacks 245 described with reference to FIG. 2. In the following description of the process flow 600, operations between the node 605 and the deployment group 610 may be performed in a different order or at a different time than as shown. Additionally or alternatively, some operations may be omitted from the process flow 600, and other operations may be added to the process flow 600.

At 615, the node 605 may identify a declarative deployment file defining a deployment configuration for multiple logical single-tenant system stacks supported by a compute container system. The deployment configuration may include a set of deployment criteria and a failure threshold. In some examples, the set of deployment criteria may include a deployment group size, a number of deployment groups in the set of deployment groups, one or more logical single-tenant system stack types, one or more logical single-tenant system stack environments, a maximum time duration for the one or more system updates, or a combination thereof.

At 620, the node 605 may determine, based on the set of deployment criteria, a set of deployment groups for implementing one or more system updates. The set of deployment groups may include a deployment group 610, which may include a first set of logical single-tenant system stacks from the multiple logical single-tenant system stacks supported by the compute container system. In some examples, the node 605 may determine a number of logical single-tenant system stacks to include in the deployment group 610 based on a deployment group size specified in the deployment criteria. Additionally or alternatively, the node 605 may determine a deployment schedule for the set of deployment groups. For example, the node 605 may determine to implement the one or more system updates at the deployment group 610 prior to implementing the one or more system updates at other deployment groups. In some examples, the deployment schedule may be based on a number of customers supported by the logical single-tenant system stacks in the deployment group 610 (e.g., which may correspond to a load that the logical single-tenant system stack supports).

At 625, the node 605 may implement the one or more system updates for the set of deployment groups in accordance with the deployment schedule and the failure threshold. For example, the node 605 may deploy the one or more system updates at the deployment group 610 prior to implementing the one or more system updates at other deployment groups in accordance with the deployment schedule. In some examples, each logical single-tenant system stack in the deployment group 610 may include an application server component, a web server component, and a database component. In such examples, the node 605 may implement the one or more system updates such that the application server component, the web server component, and the database component for each logical single-tenant system stack are configured with the same software version.

At 630, the logical single-tenant system stacks in the deployment group 610 may transmit one or more notifications to the node 605. These notifications may indicate a completion status of the one or more updates, an error status of the one or more updates, an elapsed time of the one or more updates, or a combination thereof. In some examples, the logical single-tenant system stacks in the deployment group 610 may transmit the one or more notifications based on receiving a polling message from the node 605. The node 605 may determine whether to continue implementing the one or more system updates based on receiving the one or more notifications.

At 635, the node 605 may determine that the one or more system updates have exceeded the failure threshold based on processing the one or more notifications from the logical single-tenant system stacks in the deployment group 610. For example, the node 605 may determine that the one or more system updates have exceeded a maximum error threshold or a maximum time duration. In some examples, the node 605 may generate deployment metadata based on determining that the one or more system updates have exceeded the failure threshold. The deployment metadata may indicate a version of the one or more system updates, a time at which the one or more system updates exceeded the failure threshold, a stack component at which the one or more system updates exceeded the failure threshold, or a combination thereof. The node 605 may use this deployment metadata to implement subsequent system updates for the set of deployment groups.

At 640, the node 605 may stop deployment of the one or more system updates at the logical single-tenant system stacks in the deployment group 610 based on determining that the one or more system updates have exceeded the failure threshold. Additionally or alternatively, the node 605 may refrain from deploying the one or more system updates to other deployment groups in the set of deployment groups based on determining that the one or more system updates have exceeded the failure threshold. In some examples, the node 605 may identify a last known good software version for the logical single-tenant system stacks in the deployment group 610 based on the one or more system updates exceeding the failure threshold, and may deploy the last known good software version to the logical single-tenant system stacks in the deployment group 610.

The process flow 600 may support techniques for improved deployment of system updates to logical single-tenant system stacks in a single-tenant environment. For example, the described techniques may enable the node 605 to implement system updates with greater efficiency based on using a staggered deployment release. For example, the node 605 may deploy a system update to the deployment group 610 prior to implementing the system update to other deployment groups. If, for example, the system update fails at the deployment group 610, the node 605 may refrain from implementing the system update at the other deployment groups, which may reduce errors and interruptions caused by the system update. As a result, the described techniques may improve the likelihood of the node 605 successfully detecting and mitigating errors during the deployment process.

Figure 7:
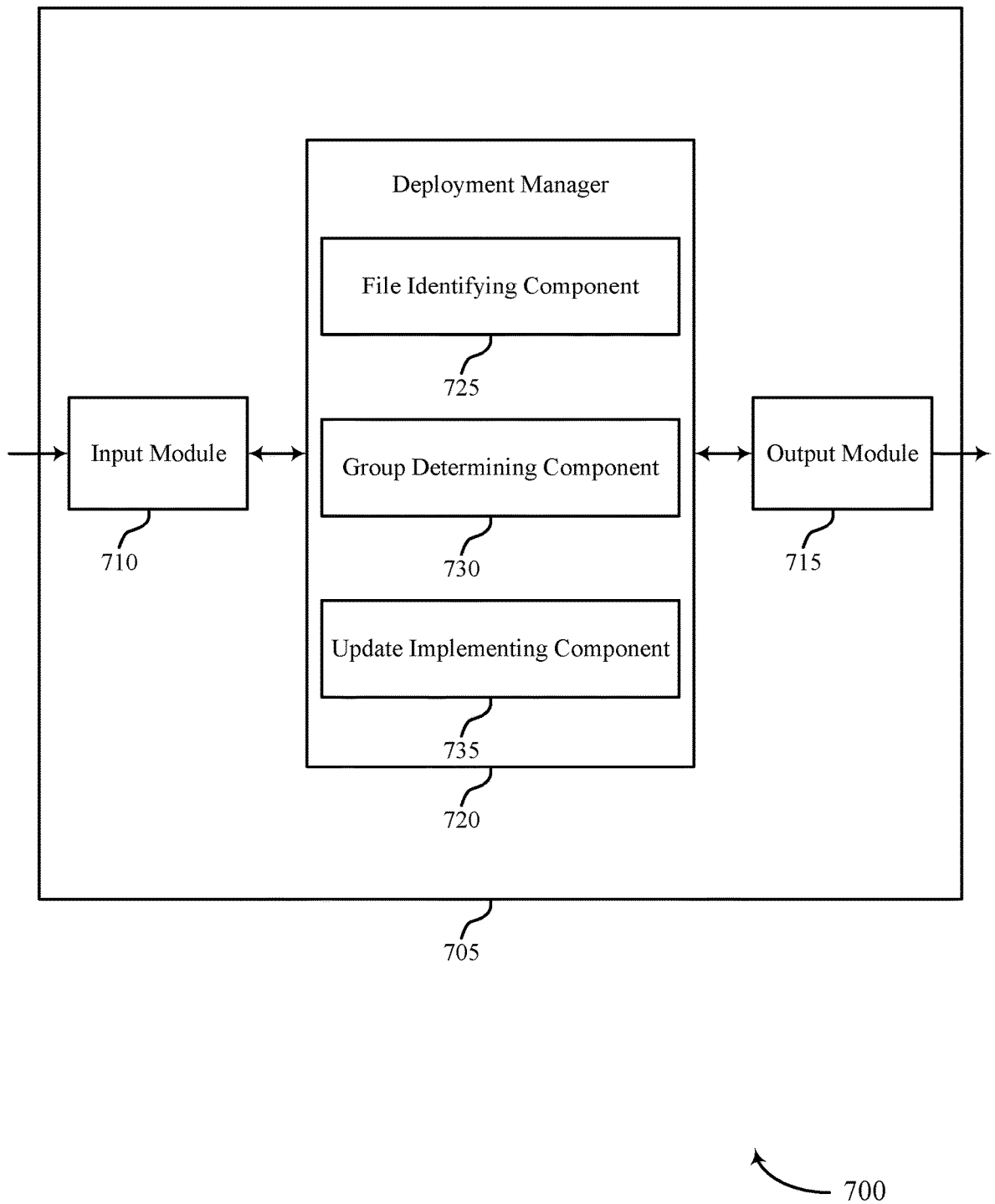
FIG. 7 shows a block diagram of an apparatus that supports tenant declarative deployments with release staggering in accordance with aspects of the present disclosure.

FIG. 7 shows a block diagram 700 of a device 705 that supports tenant declarative deployments with release staggering in accordance with aspects of the present disclosure. The device 705 may include an input module 710, an output module 715, and a deployment manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the deployment manager 720 to support tenant declarative deployments with release staggering. In some cases, the input module 710 may be a component of an input/output (I/O) controller 910 as described with reference to FIG. 9.

The output module 715 may manage output signals for the device 705. For example, the output module 715 may receive signals from other components of the device 705, such as the deployment manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the deployment manager 720 may include a file identifying component 725, a group determining component 730, an update implementing component 735, or any combination thereof. In some examples, the deployment manager 720, or various components thereof, may be configured to perform various operations (e.g., receiving, monitoring, transmitting) using or otherwise in cooperation with the input module 710, the output module 715, or both. For example, the deployment manager 720 may receive information from the input module 710, send information to the output module 715, or be integrated in combination with the input module 710, the output module 715, or both to receive information, transmit information, or perform various other operations as described herein.

The deployment manager 720 may support software deployment at the device 705 in accordance with examples disclosed herein. The file identifying component 725 may be configured as or otherwise support a means for identifying a declarative deployment file that defines a deployment configuration for multiple logical single-tenant system stacks supported by the device 705, the deployment configuration including at least a set of deployment criteria and a failure threshold. The group determining component 730 may be configured as or otherwise support a means for determining, based on the set of deployment criteria, a set of deployment groups for implementing one or more system updates, the set of deployment groups including at least a first deployment group, the first deployment group including a first set of logical single-tenant system stacks from the multiple logical single-tenant system stacks. The update implementing component 735 may be configured as or otherwise support a means for implementing the one or more system updates for the set of deployment groups based on the failure threshold.

Figure 8:
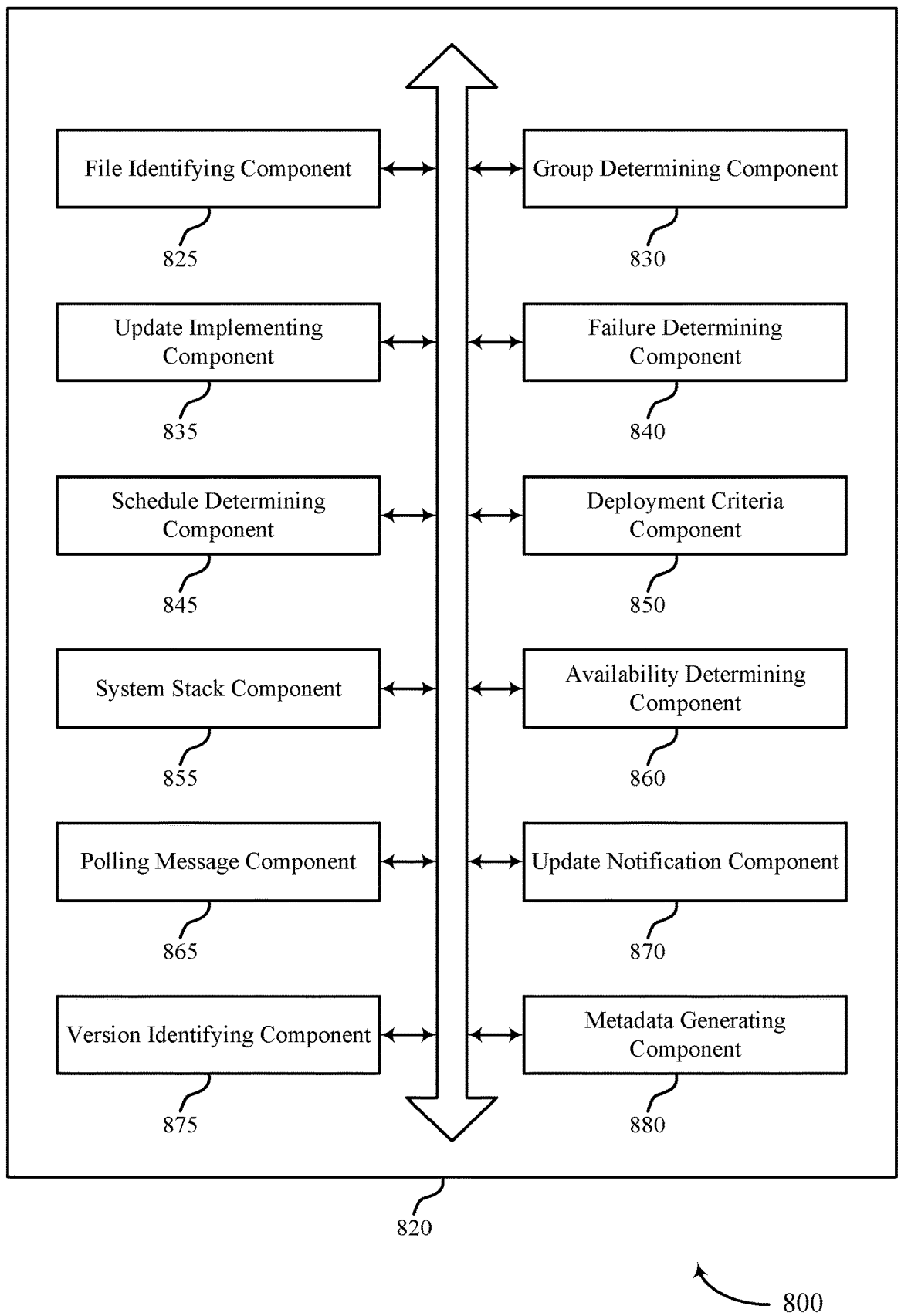
FIG. 8 shows a block diagram of a deployment manager that supports tenant declarative deployments with release staggering in accordance with aspects of the present disclosure.

FIG. 8 shows a block diagram 800 of a deployment manager 820 that supports tenant declarative deployments with release staggering in accordance with aspects of the present disclosure. The deployment manager 820 may be an example of aspects of a deployment manager or a deployment manager 720, or both, as described herein. The deployment manager 820, or various components thereof, may be an example of means for performing various aspects of tenant declarative deployments with release staggering as described herein. For example, the deployment manager 820 may include a file identifying component 825, a group determining component 830, an update implementing component 835, a failure determining component 840, a schedule determining component 845, a deployment criteria component 850, a system stack component 855, an availability determining component 860, a polling message component 865, an update notification component 870, a version identifying component 875, a metadata generating component 880, or any combination thereof. Each of these components may communicate, directly or indirectly, with one another (e.g., via one or more buses).

The deployment manager 820 may support software deployment at the device 805 in accordance with examples disclosed herein. The file identifying component 825 may be configured as or otherwise support a means for identifying a declarative deployment file that defines a deployment configuration for multiple logical single-tenant system stacks supported by the device 805, the deployment configuration including at least a set of deployment criteria and a failure threshold. The group determining component 830 may be configured as or otherwise support a means for determining, based on the set of deployment criteria, a set of deployment groups for implementing one or more system updates, the set of deployment groups including at least a first deployment group, the first deployment group including a first set of logical single-tenant system stacks from the multiple logical single-tenant system stacks. The update implementing component 835 may be configured as or otherwise support a means for implementing the one or more system updates for the set of deployment groups based on the failure threshold.

In some examples, the failure determining component 840 may be configured as or otherwise support a means for determining that the one or more system updates for the first deployment group have exceeded the failure threshold. In some examples, the update implementing component 835 may be configured as or otherwise support a means for refraining from implementing the one or more system updates for other deployment groups in the set of deployment groups based on the one or more system updates exceeding the failure threshold.

In some examples, the version identifying component 875 may be configured as or otherwise support a means for identifying a last known good version for the first set of logical single-tenant system stacks in the first deployment group based on the one or more system updates exceeding the failure threshold. In some examples, the update implementing component 835 may be configured as or otherwise support a means for implementing the last known good version for the first set of logical single-tenant system stacks based on the identifying.

In some examples, the metadata generating component 880 may be configured as or otherwise support a means for generating deployment metadata based on the one or more system updates exceeding the failure threshold, the deployment metadata indicating a version of the one or more system updates that exceeded the failure threshold, a time at which the one or more system updates exceeded the failure threshold, a stack component at which the one or more system updates exceeded the failure threshold, or a combination thereof. In some examples, the update implementing component 835 may be configured as or otherwise support a means for implementing subsequent system updates for the set of deployment groups based on the deployment metadata.

In some examples, the schedule determining component 845 may be configured as or otherwise support a means for determining a staggered deployment schedule for the set of deployment groups based on the deployment configuration. In some examples, the update implementing component 835 may be configured as or otherwise support a means for implementing the one or more system updates for the first deployment group prior to implementing the one or more system updates for a second deployment group from the set of deployment groups based on the staggered deployment schedule.

In some examples, the staggered deployment schedule may be based on a number of customers supported by the first set of logical single-tenant system stacks in the first deployment group and a number of customers supported by a second set of logical single-tenant system stacks in the second deployment group.

In some examples, the set of deployment criteria may include a deployment group size, a number of deployment groups in the set of deployment groups, one or more logical single-tenant system stack types, one or more logical single-tenant system stack environments, a maximum time duration for the one or more system updates, or a combination thereof. In some examples, the failure threshold may include a maximum error threshold for the one or more system updates.

In some examples, the failure determining component 840 may be configured as or otherwise support a means for determining that the one or more system updates for the first deployment group have exceeded a maximum time duration. In some examples, the update implementing component 835 may be configured as or otherwise support a means for refraining from implementing the one or more system updates for other deployment groups in the set of deployment groups based on the one or more system updates exceeding the maximum time duration.

In some examples, the group determining component 830 may be configured as or otherwise support a means for determining a number of logical single-tenant system stacks to include in the first set of logical single-tenant system stacks based on a deployment group size specified in the deployment criteria. In some examples, the first set of logical single-tenant system stacks may include a first logical single-tenant system stack. In some examples, the first logical single-tenant system stack may include an application server component, a web server component, and a database.

In some examples, the schedule determining component 845 may be configured as or otherwise support a means for determining to implement the one or more system updates at a first logical single-tenant system stack prior to implementing the one or more system updates at the first set of logical single-tenant system stacks based on the deployment configuration specifying that the one or more system updates are to be implemented at the first logical single-tenant system stack before implementing the one or more system updates in batches of logical single-tenant system stacks.

In some examples, the availability determining component 860 may be configured as or otherwise support a means for determining that each logical single-tenant system stack of the first set of logical single-tenant system stacks is available for updating prior to implementing the one or more system updates. In some examples, an availability of a logical single-tenant system stack may be based on whether an active process is being executed, whether a software version criterion is satisfied, whether a maintenance window is satisfied, or a combination thereof.

In some examples, the polling message component 865 may be configured as or otherwise support a means for transmitting, to the set of deployment groups, a polling message associated with the one or more system updates. In some examples, the update notification component 870 may be configured as or otherwise support a means for receiving, from at least one deployment group in the set of deployment groups and based on the polling message, one or more notifications associated with the one or more system updates, where implementing the one or more system updates is based on receiving the one or more notifications.

In some examples, the one or more notifications may indicate a completion status of the one or more system updates, an error status of the one or more system updates, an elapsed time of the one or more system updates, or a combination thereof.

Figure 9:
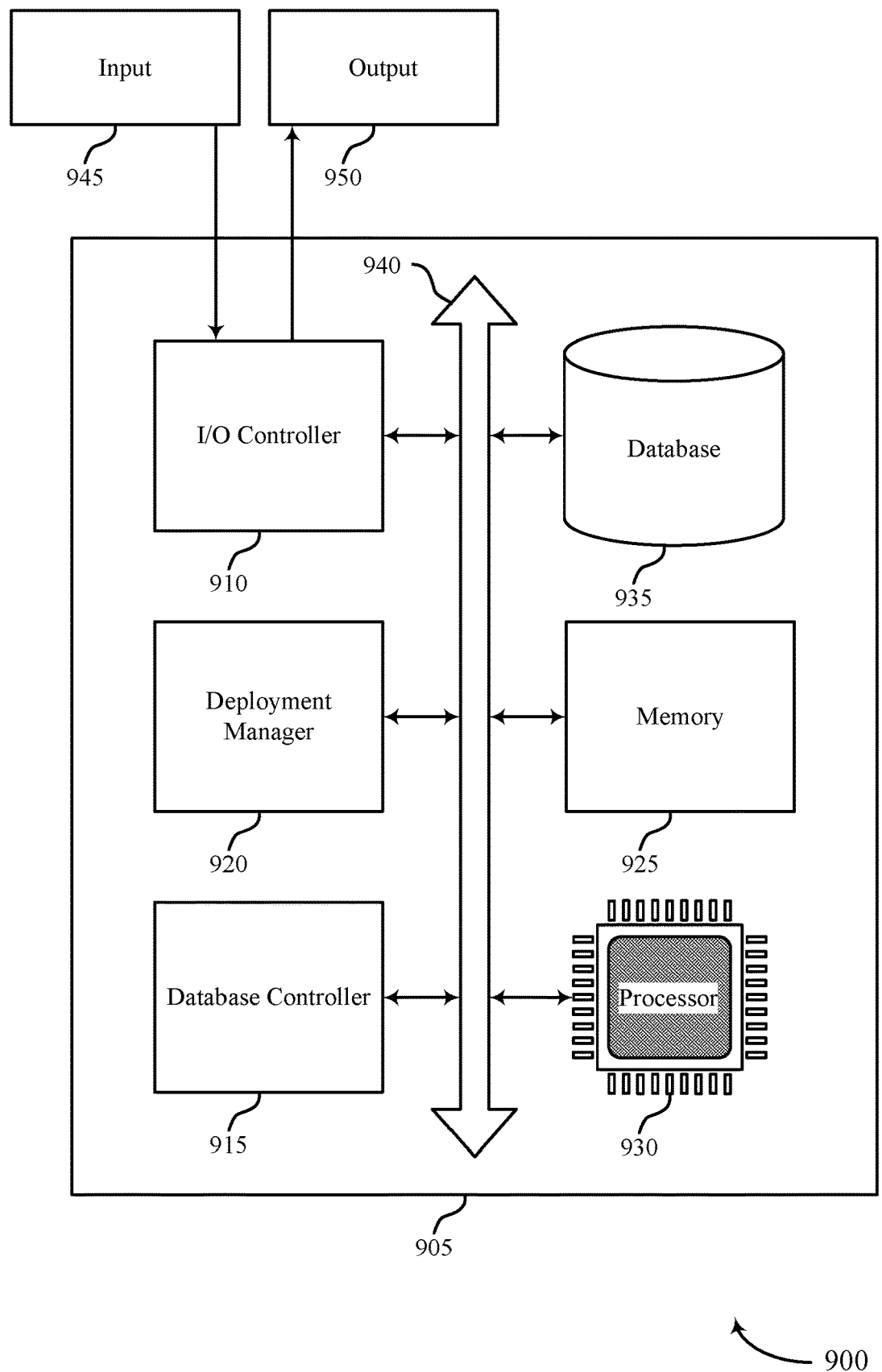
FIG. 9 shows a diagram of a system including a device that supports tenant declarative deployments with release staggering in accordance with aspects of the present disclosure.

FIG. 9 shows a diagram of a system 900 including a device 905 that supports tenant declarative deployments with release staggering in accordance with aspects of the present disclosure. The device 905 may be an example of or include the components of a device 705 as described herein. The device 905 may include components for declarative deployments, communications, and including components for transmitting and receiving communications, such as a deployment manager 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor 930 to perform various functions described herein. In some cases, the memory 925 may contain, among other things, a basic I/O system (BIOS) which may control basic hardware or software operation such as the interaction with peripheral components or devices.

The processor 930 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting tenant declarative deployments with release staggering).

The deployment manager 920 may support software deployment at the device 905 in accordance with examples as disclosed herein. For example, the deployment manager 920 may be configured as or otherwise support a means for identifying a declarative deployment file that defines a deployment configuration for multiple logical single-tenant system stacks supported by the device 905, the deployment configuration including at least a set of deployment criteria and a failure threshold. The deployment manager 920 may be configured as or otherwise support a means for determining, based on the set of deployment criteria, a set of deployment groups for implementing one or more system updates, the set of deployment groups including at least a first deployment group, the first deployment group including a first set of logical single-tenant system stacks from the multiple logical single-tenant system stacks. The deployment manager 920 may be configured as or otherwise support a means for implementing the one or more system updates for the set of deployment groups based on the failure threshold.

By including or configuring the deployment manager 920 in accordance with examples as described herein, the device 905 may support techniques for improved deployment of system updates to logical single-tenant system stacks in a single-tenant environment. For example, the described techniques may enable the device 905 to implement system updates for logical single-tenant system stacks using a staggered deployment release, which may improve the likelihood of the device 905 successfully mitigating errors during the deployment process. As a result, the device 905 may deploy system updates to logical single-tenant system stacks with improved reliability and greater processing efficiency, among other benefits.

Figure 10:
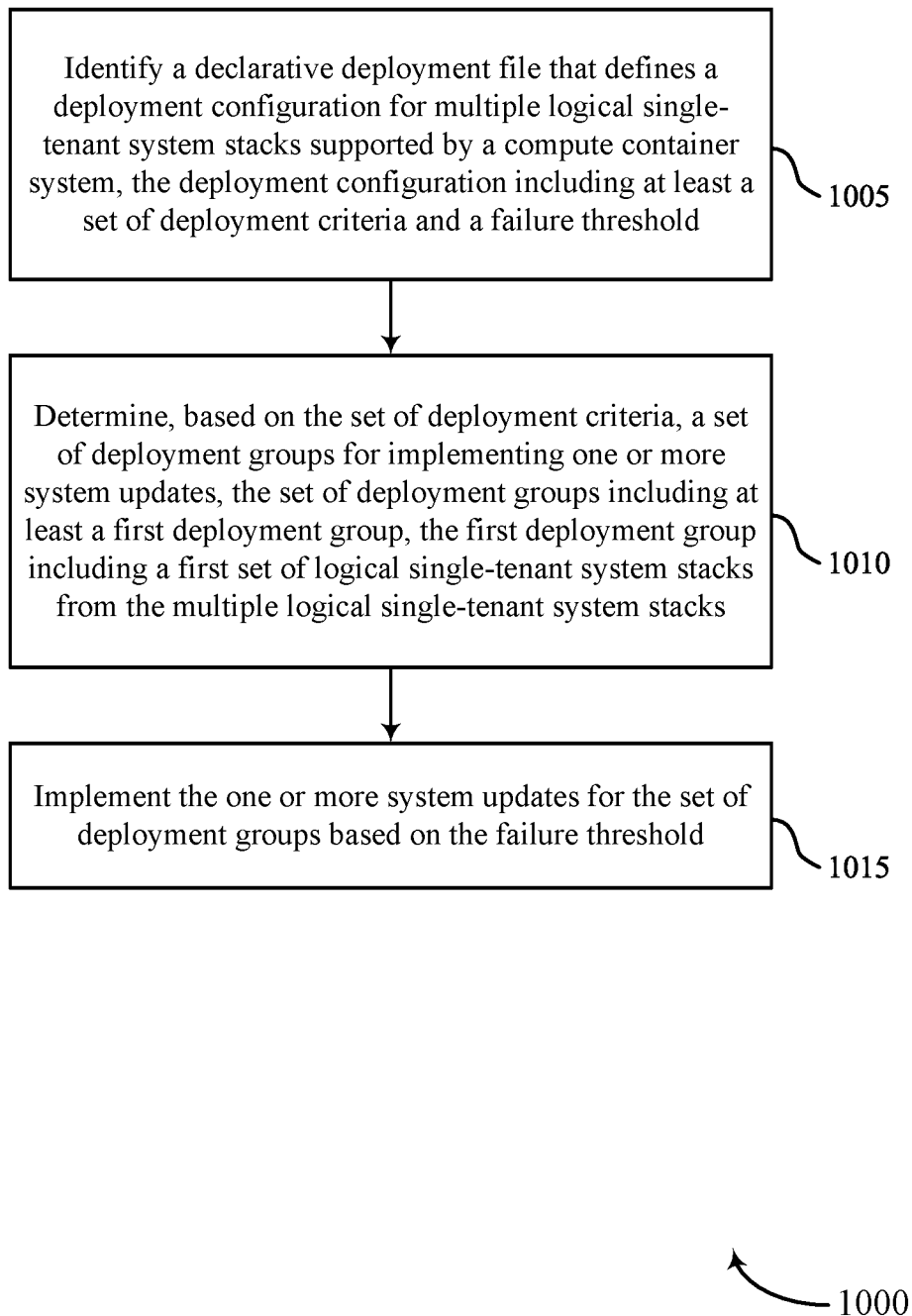
FIGS. 10 through 13 show flowcharts illustrating methods that support tenant declarative deployments with release staggering in accordance with aspects of the present disclosure.

FIG. 10 shows a flowchart illustrating a method 1000 that supports tenant declarative deployments with release staggering in accordance with aspects of the present disclosure. The operations of the method 1000 may be implemented by a compute container system or its components as described herein. For example, the operations of the method 1000 may be performed by a compute container system as described with reference to FIGS. 1 through 9. In some examples, a compute container system may execute a set of instructions to control the functional elements of the compute container system to perform the described functions. Additionally or alternatively, the compute container system may perform aspects of the described functions using special-purpose hardware.

At 1005, the method may include identifying a declarative deployment file that defines a deployment configuration for multiple logical single-tenant system stacks supported by the compute container system, the deployment configuration including at least a set of deployment criteria and a failure threshold. The operations of 1005 may be performed in accordance with examples as disclosed herein. In some examples, aspects of the operations of 1005 may be performed by a file identifying component 825 as described with reference to FIG. 8.

At 1010, the method may include determining, based on the set of deployment criteria, a set of deployment groups for implementing one or more system updates, the set of deployment groups including at least a first deployment group, the first deployment group including a first set of logical single-tenant system stacks from the multiple logical single-tenant system stacks. The operations of 1010 may be performed in accordance with examples as disclosed herein. In some examples, aspects of the operations of 1010 may be performed by a group determining component 830 as described with reference to FIG. 8.

At 1015, the method may include implementing the one or more system updates for the set of deployment groups based on the failure threshold. The operations of 1015 may be performed in accordance with examples as disclosed herein. In some examples, aspects of the operations of 1015 may be performed by an update implementing component 835 as described with reference to FIG. 8.

Figure 11:
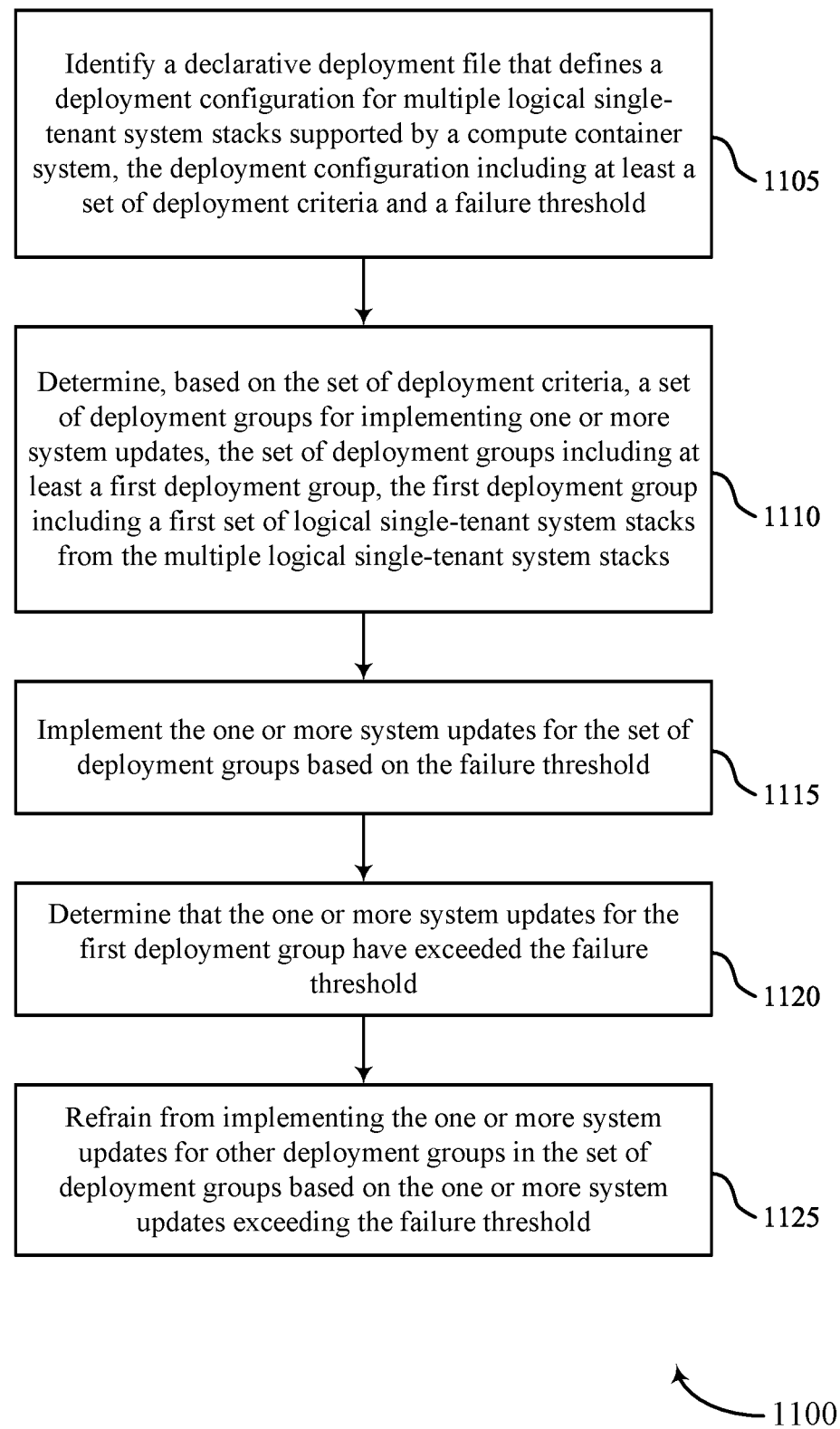

FIG. 11 shows a flowchart illustrating a method 1100 that supports tenant declarative deployments with release staggering in accordance with aspects of the present disclosure. The operations of the method 1100 may be implemented by a compute container system or its components as described herein. For example, the operations of the method 1100 may be performed by a compute container system as described with reference to FIGS. 1 through 9. In some examples, a compute container system may execute a set of instructions to control the functional elements of the compute container system to perform the described functions. Additionally or alternatively, the compute container system may perform aspects of the described functions using special-purpose hardware.

At 1105, the method may include identifying a declarative deployment file that defines a deployment configuration for multiple logical single-tenant system stacks supported by the compute container system, the deployment configuration including at least a set of deployment criteria and a failure threshold. The operations of 1105 may be performed in accordance with examples as disclosed herein. In some examples, aspects of the operations of 1105 may be performed by a file identifying component 825 as described with reference to FIG. 8.

At 1110, the method may include determining, based on the set of deployment criteria, a set of deployment groups for implementing one or more system updates, the set of deployment groups including at least a first deployment group, the first deployment group including a first set of logical single-tenant system stacks from the multiple logical single-tenant system stacks. The operations of 1110 may be performed in accordance with examples as disclosed herein. In some examples, aspects of the operations of 1110 may be performed by a group determining component 830 as described with reference to FIG. 8.

At 1115, the method may include implementing the one or more system updates for the set of deployment groups based on the failure threshold. The operations of 1115 may be performed in accordance with examples as disclosed herein. In some examples, aspects of the operations of 1115 may be performed by an update implementing component 835 as described with reference to FIG. 8.

At 1120, the method may include determining that the one or more system updates for the first deployment group have exceeded the failure threshold. The operations of 1120 may be performed in accordance with examples as disclosed herein. In some examples, aspects of the operations of 1120 may be performed by a failure determining component 840 as described with reference to FIG. 8.

At 1125, the method may include refraining from implementing the one or more system updates for other deployment groups in the set of deployment groups based on the one or more system updates exceeding the failure threshold. The operations of 1125 may be performed in accordance with examples as disclosed herein. In some examples, aspects of the operations of 1125 may be performed by an update implementing component 835 as described with reference to FIG. 8.

Figure 12:
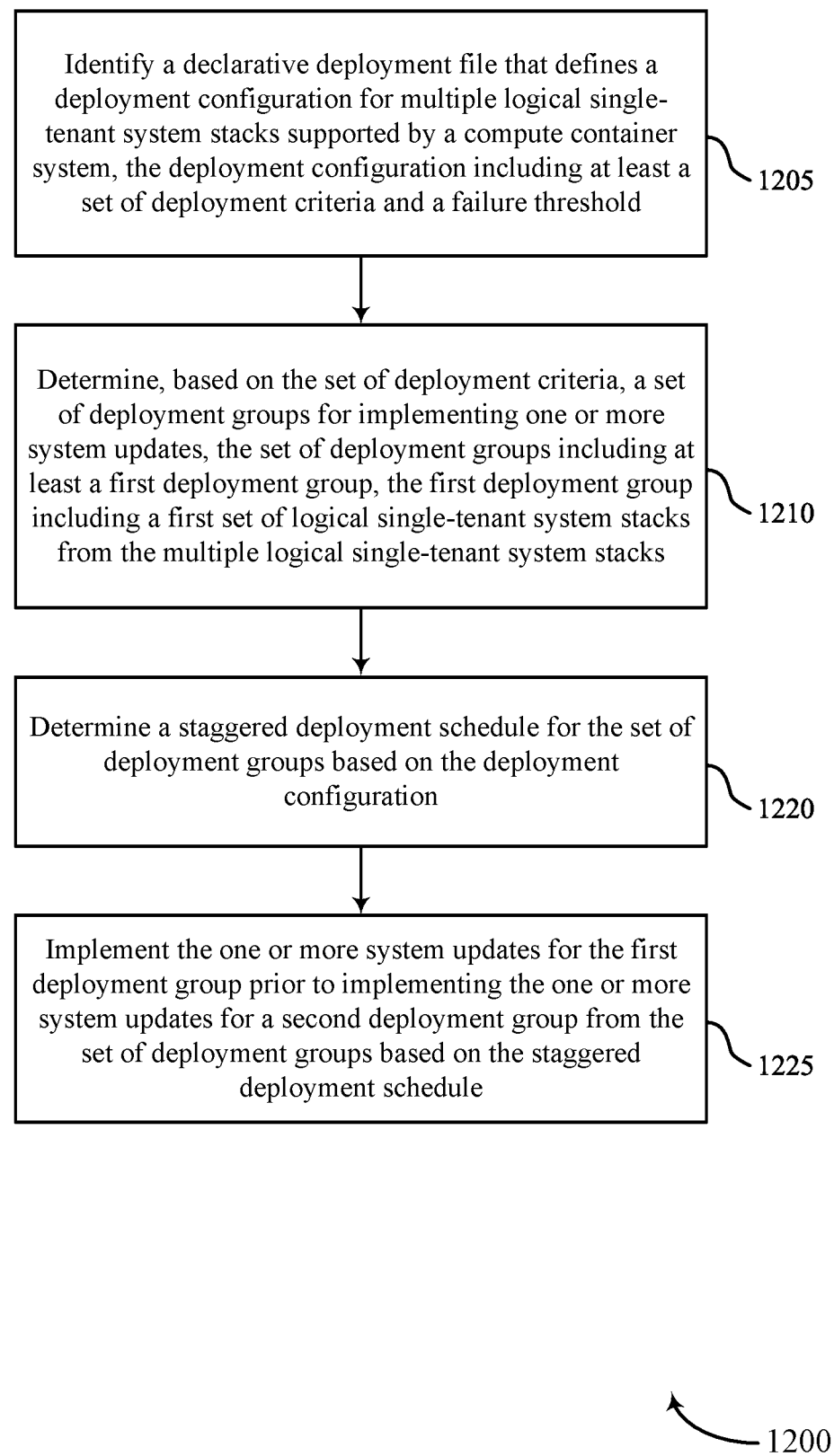

FIG. 12 shows a flowchart illustrating a method 1200 that supports tenant declarative deployments with release staggering in accordance with aspects of the present disclosure. The operations of the method 1200 may be implemented by a compute container system or its components as described herein. For example, the operations of the method 1200 may be performed by a compute container system as described with reference to FIGS. 1 through 9. In some examples, a compute container system may execute a set of instructions to control the functional elements of the compute container system to perform the described functions. Additionally or alternatively, the compute container system may perform aspects of the described functions using special-purpose hardware.

At 1205, the method may include identifying a declarative deployment file that defines a deployment configuration for multiple logical single-tenant system stacks supported by the compute container system, the deployment configuration including at least a set of deployment criteria and a failure threshold. The operations of 1205 may be performed in accordance with examples as disclosed herein. In some examples, aspects of the operations of 1205 may be performed by a file identifying component 825 as described with reference to FIG. 8.

At 1210, the method may include determining, based on the set of deployment criteria, a set of deployment groups for implementing one or more system updates, the set of deployment groups including at least a first deployment group, the first deployment group including a first set of logical single-tenant system stacks from the multiple logical single-tenant system stacks. The operations of 1210 may be performed in accordance with examples as disclosed herein. In some examples, aspects of the operations of 1210 may be performed by a group determining component 830 as described with reference to FIG. 8.

At 1215, the method may include implementing the one or more system updates for the set of deployment groups based on the failure threshold. The operations of 1215 may be performed in accordance with examples as disclosed herein. In some examples, aspects of the operations of 1215 may be performed by an update implementing component 835 as described with reference to FIG. 8.

At 1220, the method may include determining a staggered deployment schedule for the set of deployment groups based on the deployment configuration. The operations of 1220 may be performed in accordance with examples as disclosed herein. In some examples, aspects of the operations of 1220 may be performed by a schedule determining component 845 as described with reference to FIG. 8.

At 1225, the method may include implementing the one or more system updates for the first deployment group prior to implementing the one or more system updates for a second deployment group from the set of deployment groups based on the staggered deployment schedule. The operations of 1225 may be performed in accordance with examples as disclosed herein. In some examples, aspects of the operations of 1225 may be performed by an update implementing component 835 as described with reference to FIG. 8.

Figure 13:
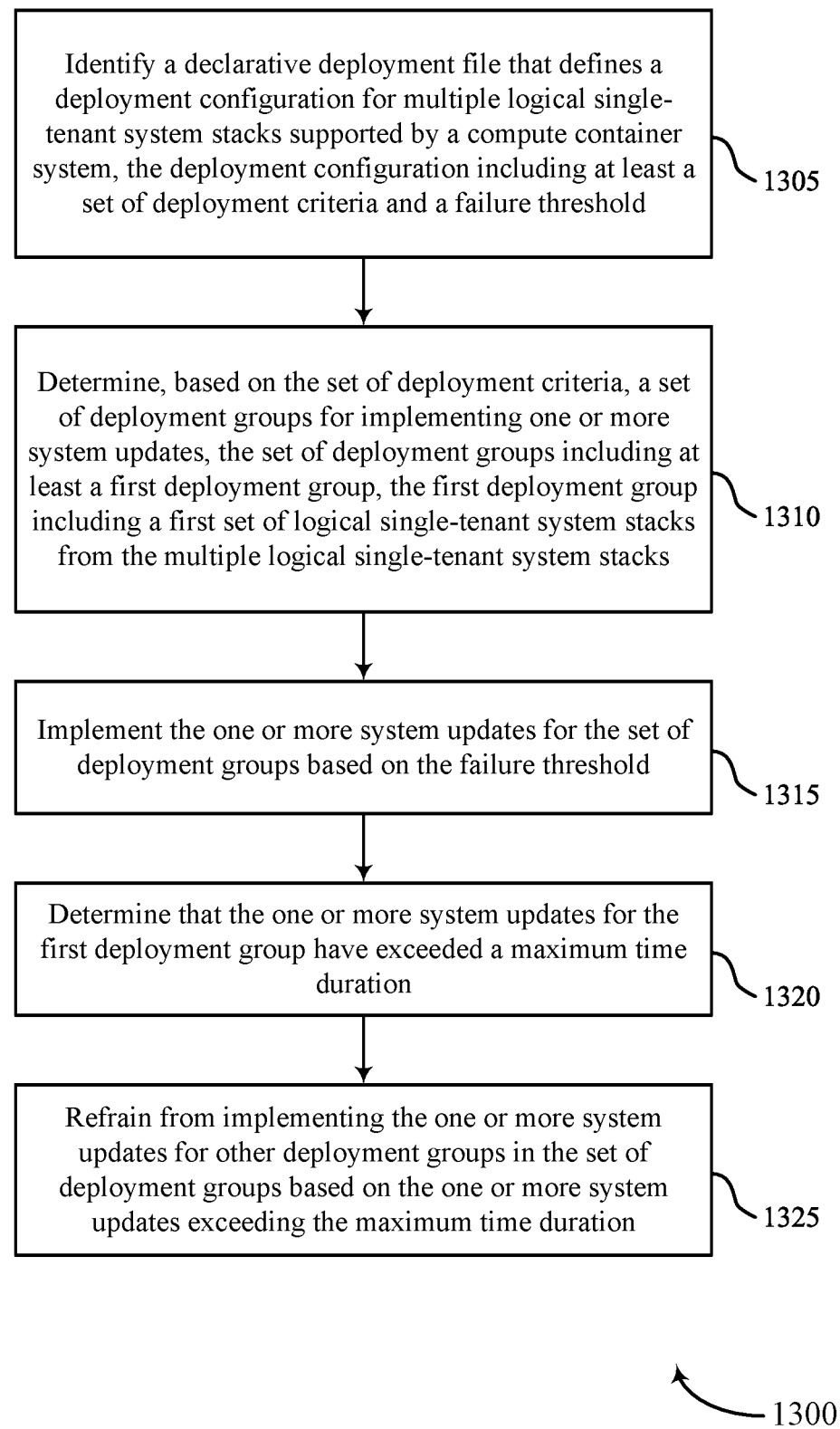

FIG. 13 shows a flowchart illustrating a method 1300 that supports tenant declarative deployments with release staggering in accordance with aspects of the present disclosure. The operations of the method 1300 may be implemented by a compute container system or its components as described herein. For example, the operations of the method 1300 may be performed by a compute container system as described with reference to FIGS. 1 through 9. In some examples, a compute container system may execute a set of instructions to control the functional elements of the compute container system to perform the described functions. Additionally or alternatively, the compute container system may perform aspects of the described functions using special-purpose hardware.

At 1305, the method may include identifying a declarative deployment file that defines a deployment configuration for multiple logical single-tenant system stacks supported by the compute container system, the deployment configuration including at least a set of deployment criteria and a failure threshold. The operations of 1305 may be performed in accordance with examples as disclosed herein. In some examples, aspects of the operations of 1305 may be performed by a file identifying component 825 as described with reference to FIG. 8.

At 1310, the method may include determining, based on the set of deployment criteria, a set of deployment groups for implementing one or more system updates, the set of deployment groups including at least a first deployment group, the first deployment group including a first set of logical single-tenant system stacks from the multiple logical single-tenant system stacks. The operations of 1310 may be performed in accordance with examples as disclosed herein. In some examples, aspects of the operations of 1310 may be performed by a group determining component 830 as described with reference to FIG. 8.

At 1315, the method may include implementing the one or more system updates for the set of deployment groups based on the failure threshold. The operations of 1315 may be performed in accordance with examples as disclosed herein. In some examples, aspects of the operations of 1315 may be performed by an update implementing component 835 as described with reference to FIG. 8.

At 1320, the method may include determining that the one or more system updates for the first deployment group have exceeded a maximum time duration. The operations of 1320 may be performed in accordance with examples as disclosed herein. In some examples, aspects of the operations of 1320 may be performed by a failure determining component 840 as described with reference to FIG. 8.

At 1325, the method may include refraining from implementing the one or more system updates for other deployment groups in the set of deployment groups based on the one or more system updates exceeding the maximum time duration. The operations of 1325 may be performed in accordance with examples as disclosed herein. In some examples, aspects of the operations of 1325 may be performed by an update implementing component 835 as described with reference to FIG. 8.

The following is one or more first examples of aspects of the present disclosure:

A method for software deployment at a compute container system is described. The method may include identifying a declarative deployment file that defines a deployment configuration for a plurality of logical single-tenant system stacks supported by the compute container system, the deployment configuration comprising at least a set of deployment criteria and a failure threshold, determining, based at least in part on the set of deployment criteria, a set of deployment groups for implementing one or more system updates, the set of deployment groups comprising at least a first deployment group, the first deployment group comprising a first set of logical single-tenant system stacks from the plurality of logical single-tenant system stacks, and implementing the one or more system updates for the set of deployment groups based at least in part on the failure threshold.

An apparatus for software deployment at a compute container system is described. The apparatus may include a processor, memory coupled with the processor, and instructions stored in the memory. The instructions may be executable by the processor to cause the apparatus to identify a declarative deployment file that defines a deployment configuration for a plurality of logical single-tenant system stacks supported by the compute container system, the deployment configuration comprising at least a set of deployment criteria and a failure threshold, determine, based at least in part on the set of deployment criteria, a set of deployment groups for implementing one or more system updates, the set of deployment groups comprising at least a first deployment group, the first deployment group comprising a first set of logical single-tenant system stacks from the plurality of logical single-tenant system stacks, and implement the one or more system updates for the set of deployment groups based at least in part on the failure threshold.

Another apparatus for software deployment at a compute container system is described. The apparatus may include means for identifying a declarative deployment file that defines a deployment configuration for a plurality of logical single-tenant system stacks supported by the compute container system, the deployment configuration comprising at least a set of deployment criteria and a failure threshold, means for determining, based at least in part on the set of deployment criteria, a set of deployment groups for implementing one or more system updates, the set of deployment groups comprising at least a first deployment group, the first deployment group comprising a first set of logical single-tenant system stacks from the plurality of logical single-tenant system stacks, and means for implementing the one or more system updates for the set of deployment groups based at least in part on the failure threshold.

A non-transitory computer-readable medium storing code for software deployment at a compute container system is described. The code may include instructions executable by a processor to identify a declarative deployment file that defines a deployment configuration for a plurality of logical single-tenant system stacks supported by the compute container system, the deployment configuration comprising at least a set of deployment criteria and a failure threshold, determine, based at least in part on the set of deployment criteria, a set of deployment groups for implementing one or more system updates, the set of deployment groups comprising at least a first deployment group, the first deployment group comprising a first set of logical single-tenant system stacks from the plurality of logical single-tenant system stacks, and implement the one or more system updates for the set of deployment groups based at least in part on the failure threshold.

Some examples of the method, apparatuses, and non-transitory computer-readable medium described herein may further include operations, features, means, or instructions for determining that the one or more system updates for the first deployment group may have exceeded the failure threshold and refraining from implementing the one or more system updates for other deployment groups in the set of deployment groups based at least in part on the one or more system updates exceeding the failure threshold.

Some examples of the method, apparatuses, and non-transitory computer-readable medium described herein may further include operations, features, means, or instructions for identifying a last known good version for the first set of logical single-tenant system stacks in the first deployment group based at least in part on the one or more system updates exceeding the failure threshold and implementing the last known good version for the first set of logical single-tenant system stacks based at least in part on the identifying.

Some examples of the method, apparatuses, and non-transitory computer-readable medium described herein may further include operations, features, means, or instructions for generating deployment metadata based at least in part on the one or more system updates exceeding the failure threshold, the deployment metadata indicating a version of the one or more system updates that exceeded the failure threshold, a time at which the one or more system updates exceeded the failure threshold, a stack component at which the one or more system updates exceeded the failure threshold, or a combination thereof and implementing subsequent system updates for the set of deployment groups based at least in part on the deployment metadata.

Some examples of the method, apparatuses, and non-transitory computer-readable medium described herein may further include operations, features, means, or instructions for determining a staggered deployment schedule for the set of deployment groups based at least in part on the deployment configuration, wherein implementing the one or more system updates comprises and implementing the one or more system updates for the first deployment group prior to implementing the one or more system updates for a second deployment group from the set of deployment groups based at least in part on the staggered deployment schedule.

In some examples of the method, apparatuses, and non-transitory computer-readable medium described herein, the staggered deployment schedule may be based at least in part on a number of customers supported by the first set of logical single-tenant system stacks in the first deployment group and a number of customers supported by a second set of logical single-tenant system stacks in the second deployment group.

In some examples of the method, apparatuses, and non-transitory computer-readable medium described herein, the set of deployment criteria comprises a deployment group size, a number of deployment groups in the set of deployment groups, one or more logical single-tenant system stack types, one or more logical single-tenant system stack environments, a maximum time duration for the one or more system updates, or a combination thereof and the failure threshold comprises a maximum error threshold for the one or more system updates.

Some examples of the method, apparatuses, and non-transitory computer-readable medium described herein may further include operations, features, means, or instructions for determining that the one or more system updates for the first deployment group may have exceeded a maximum time duration and refraining from implementing the one or more system updates for other deployment groups in the set of deployment groups based at least in part on the one or more system updates exceeding the maximum time duration.

Some examples of the method, apparatuses, and non-transitory computer-readable medium described herein may further include operations, features, means, or instructions for determining a number of logical single-tenant system stacks to include in the first set of logical single-tenant system stacks based at least in part on a deployment group size specified in the deployment criteria.

In some examples of the method, apparatuses, and non-transitory computer-readable medium described herein, the first set of logical single-tenant system stacks comprises a first logical single-tenant system stack and the first logical single-tenant system stack comprises an application server component, a web server component, and a database.

Some examples of the method, apparatuses, and non-transitory computer-readable medium described herein may further include operations, features, means, or instructions for determining to implement the one or more system updates at a first logical single-tenant system stack prior to implementing the one or more system updates at the first set of logical single-tenant system stacks based at least in part on the deployment configuration specifying that the one or more system updates may be to be implemented at the first logical single-tenant system stack before implementing the one or more system updates in batches of logical single-tenant system stacks.

Some examples of the method, apparatuses, and non-transitory computer-readable medium described herein may further include operations, features, means, or instructions for determining that each logical single-tenant system stack of the first set of logical single-tenant system stacks may be available for updating prior to implementing the one or more system updates.

In some examples of the method, apparatuses, and non-transitory computer-readable medium described herein, an availability of a logical single-tenant system stack may be based at least in part on whether an active process may be being executed, whether a software version criterion may be satisfied, whether a maintenance window may be satisfied, or a combination thereof.

Some examples of the method, apparatuses, and non-transitory computer-readable medium described herein may further include operations, features, means, or instructions for transmitting, to the set of deployment groups, a polling message associated with the one or more system updates and receiving, from at least one deployment group in the set of deployment groups and based at least in part on the polling message, one or more notifications associated with the one or more system updates, wherein implementing the one or more system updates may be based at least in part on receiving the one or more notifications.

In some examples of the method, apparatuses, and non-transitory computer-readable medium described herein, the one or more notifications indicate a completion status of the one or more system updates, an error status of the one or more system updates, an elapsed time of the one or more system updates, or a combination thereof.

It should be noted that the methods described herein describe possible implementations, and that the operations and the steps may be rearranged or otherwise modified and that other implementations are possible. Furthermore, aspects from two or more of the methods may be combined.

The following is one or more additional examples of aspects of the present disclosure:

A method of software deployment is described. The method may include identifying, at a compute container system, a declarative deployment file defining a deployment configuration for one or more of a set of logical single-tenant system stacks supported by the compute container system, each logical single-tenant system stack including an application server component, a web server component, and a database, determining, based on the deployment configuration, a deployment schedule for implementing one or more system updates for the one or more of the set of logical single-tenant system stacks, and implementing the one or more system updates for the one or more of the set of logical single-tenant system stacks in accordance with the determined deployment schedule.

An apparatus for software deployment is described. The apparatus may include a processor, memory coupled with the processor, and instructions stored in the memory. The instructions may be executable by the processor to cause the apparatus to identify, at a compute container system, a declarative deployment file defining a deployment configuration for one or more of a set of logical single-tenant system stacks supported by the compute container system, each logical single-tenant system stack including an application server component, a web server component, and a database, determine, based on the deployment configuration, a deployment schedule for implementing one or more system updates for the one or more of the set of logical single-tenant system stacks, and implement the one or more system updates for the one or more of the set of logical single-tenant system stacks in accordance with the determined deployment schedule.

Another apparatus for software deployment is described. The apparatus may include means for identifying, at a compute container system, a declarative deployment file defining a deployment configuration for one or more of a set of logical single-tenant system stacks supported by the compute container system, each logical single-tenant system stack including an application server component, a web server component, and a database, determining, based on the deployment configuration, a deployment schedule for implementing one or more system updates for the one or more of the set of logical single-tenant system stacks, and implementing the one or more system updates for the one or more of the set of logical single-tenant system stacks in accordance with the determined deployment schedule.

A non-transitory computer-readable medium storing code for software deployment is described. The code may include instructions executable by a processor to identify, at a compute container system, a declarative deployment file defining a deployment configuration for one or more of a set of logical single-tenant system stacks supported by the compute container system, each logical single-tenant system stack including an application server component, a web server component, and a database, determine, based on the deployment configuration, a deployment schedule for implementing one or more system updates for the one or more of the set of logical single-tenant system stacks, and implement the one or more system updates for the one or more of the set of logical single-tenant system stacks in accordance with the determined deployment schedule.

Some examples of the method, apparatuses, and non-transitory computer-readable medium described herein may further include operations, features, means, or instructions for determining the one or more of the set of logical single-tenant system stacks for implementing the one or more system updates based on a set of system identifiers included in the declarative deployment file, each system identifier associated with one of the set of logical single-tenant system stacks and a corresponding tenant.

In some examples of the method, apparatuses, and non-transitory computer-readable medium described herein, implementing the one or more system updates may include operations, features, means, or instructions for determining that the application server component, the web server component, the database, or a combination thereof of a respective logical single-tenant system stack may be not running an active process before implementing the one or more system updates on the respective logical single-tenant system stack.

In some examples of the method, apparatuses, and non-transitory computer-readable medium described herein, implementing the one or more system updates may include operations, features, means, or instructions for implementing the one or more system updates in a test environment or a production environment in the one or more of the set of logical single-tenant system stacks in accordance with the declarative deployment file.

Some examples of the method, apparatuses, and non-transitory computer-readable medium described herein may further include operations, features, means, or instructions for identifying an error condition in during implementation of the one or more system updates, and updating, based on identifying the error condition, the one or more of the set of logical single-tenant system stacks using last known good versions that may be maintained in association with each of the one or more of the set of logical single-tenant system stacks.

Some examples of the method, apparatuses, and non-transitory computer-readable medium described herein may further include operations, features, means, or instructions for determining that a current version of software executable in one or more of the set of logical single-tenant system stacks satisfies a software version criterion indicated in the declarative deployment file before implementing the one or more system updates.

In some examples of the method, apparatuses, and non-transitory computer-readable medium described herein, determining the deployment schedule may include operations, features, means, or instructions for determining the deployment schedule for the one or more of the set of logical single-tenant system stacks in accordance with maintenance windows for the one or more of the set of logical single-tenant system stacks specified by the declarative deployment file.

Some examples of the method, apparatuses, and non-transitory computer-readable medium described herein may further include operations, features, means, or instructions for validating the declarative deployment file before implementing the one or more system updates.

Some examples of the method, apparatuses, and non-transitory computer-readable medium described herein may further include operations, features, means, or instructions for determining the one or more of the plurality of logical single-tenant system stacks for implementing the one or more system updates based at least in part on metadata associated with one or more tenants associated with the plurality of logical single-tenant system stacks, where the metadata indicates groupings of tenants.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for software deployment at a compute container system, comprising:
   identifying a declarative deployment file that defines a deployment configuration for a plurality of logical single-tenant system stacks supported by the compute container system, the deployment configuration comprising at least a set of deployment criteria and a failure threshold;
   determining, based at least in part on the set of deployment criteria, a set of deployment groups for implementing one or more system updates, the set of deployment groups comprising at least a first deployment group, the first deployment group comprising a first set of logical single-tenant system stacks from the plurality of logical single-tenant system stacks; and
   implementing the one or more system updates for the set of deployment groups based at least in part on the failure threshold.

2. The method of claim 1, further comprising:
   determining that the one or more system updates for the first deployment group have exceeded the failure threshold; and
   refraining from implementing the one or more system updates for other deployment groups in the set of deployment groups based at least in part on the one or more system updates exceeding the failure threshold.

3. The method of claim 2, further comprising:
   identifying a last known good version for the first set of logical single-tenant system stacks in the first deployment group based at least in part on the one or more system updates exceeding the failure threshold; and
   implementing the last known good version for the first set of logical single-tenant system stacks based at least in part on the identifying.

4. The method of claim 2, further comprising:
   generating deployment metadata based at least in part on the one or more system updates exceeding the failure threshold, the deployment metadata indicating a version of the one or more system updates that exceeded the failure threshold, a time at which the one or more system updates exceeded the failure threshold, a stack component at which the one or more system updates exceeded the failure threshold, or a combination thereof; and
   implementing subsequent system updates for the set of deployment groups based at least in part on the deployment metadata.

5. The method of claim 1, further comprising:
   determining a staggered deployment schedule for the set of deployment groups based at least in part on the deployment configuration, wherein implementing the one or more system updates comprises:
   implementing the one or more system updates for the first deployment group prior to implementing the one or more system updates for a second deployment group from the set of deployment groups based at least in part on the staggered deployment schedule.

6. The method of claim 5, wherein the staggered deployment schedule is based at least in part on a number of customers supported by the first set of logical single-tenant system stacks in the first deployment group and a number of customers supported by a second set of logical single-tenant system stacks in the second deployment group.

7. The method of claim 1, wherein:
   the set of deployment criteria comprises a deployment group size, a number of deployment groups in the set of deployment groups, one or more logical single-tenant system stack types, one or more logical single-tenant system stack environments, a maximum time duration for the one or more system updates, or a combination thereof; and
   the failure threshold comprises a maximum error threshold for the one or more system updates.

8. The method of claim 1, further comprising:
   determining that the one or more system updates for the first deployment group have exceeded a maximum time duration; and
   refraining from implementing the one or more system updates for other deployment groups in the set of deployment groups based at least in part on the one or more system updates exceeding the maximum time duration.

9. The method of claim 1, further comprising:
   determining a number of logical single-tenant system stacks to include in the first set of logical single-tenant system stacks based at least in part on a deployment group size specified in the set of deployment criteria.

10. The method of claim 1, wherein:
    the first set of logical single-tenant system stacks comprises a first logical single-tenant system stack; and
    the first logical single-tenant system stack comprises an application server component, a web server component, and a database.

11. The method of claim 1, further comprising:
    determining to implement the one or more system updates at a first logical single-tenant system stack prior to implementing the one or more system updates at the first set of logical single-tenant system stacks based at least in part on the deployment configuration specifying that the one or more system updates are to be implemented at the first logical single-tenant system stack before implementing the one or more system updates in batches of logical single-tenant system stacks.

12. The method of claim 1, further comprising:
    determining that each logical single-tenant system stack of the first set of logical single-tenant system stacks is available for updating prior to implementing the one or more system updates.

13. The method of claim 12, wherein an availability of a logical single-tenant system stack is based at least in part on whether an active process is being executed, whether a software version criterion is satisfied, whether a maintenance window is satisfied, or a combination thereof.

14. The method of claim 1, further comprising:
transmitting, to the set of deployment groups, a polling message associated with the one or more system updates; and
receiving, from at least one deployment group in the set of deployment groups and based at least in part on the polling message, one or more notifications associated with the one or more system updates, wherein implementing the one or more system updates is based at least in part on receiving the one or more notifications.

15. The method of claim 14, wherein the one or more notifications indicate a completion status of the one or more system updates, an error status of the one or more system updates, an elapsed time of the one or more system updates, or a combination thereof.

16. An apparatus for software deployment at a compute container system, comprising:
a processor;
memory coupled with the processor; and
instructions stored in the memory and executable by the processor to cause the apparatus to:
identify a declarative deployment file that defines a deployment configuration for a plurality of logical single-tenant system stacks supported by the compute container system, the deployment configuration comprising at least a set of deployment criteria and a failure threshold;
determine, based at least in part on the set of deployment criteria, a set of deployment groups for implementing one or more system updates, the set of deployment groups comprising at least a first deployment group, the first deployment group comprising a first set of logical single-tenant system stacks from the plurality of logical single-tenant system stacks; and
implement the one or more system updates for the set of deployment groups based at least in part on the failure threshold.

17. The apparatus of claim 16, wherein the instructions are further executable by the processor to cause the apparatus to:
determine that the one or more system updates for the first deployment group have exceeded the failure threshold; and
refrain from implementing the one or more system updates for other deployment groups in the set of deployment groups based at least in part on the one or more system updates exceeding the failure threshold.

18. The apparatus of claim 16, wherein the instructions are further executable by the processor to cause the apparatus to:
determine a staggered deployment schedule for the set of deployment groups based at least in part on the deployment configuration, wherein the instructions to implement the one or more system updates are executable by the processor to cause the apparatus to:
implement the one or more system updates for the first deployment group prior to implementing the one or more system updates for a second deployment group from the set of deployment groups based at least in part on the staggered deployment schedule.

19. The apparatus of claim 16, wherein the instructions are further executable by the processor to cause the apparatus to:
determine that the one or more system updates for the first deployment group have exceeded a maximum time duration; and
refrain from implementing the one or more system updates for other deployment groups in the set of deployment groups based at least in part on the one or more system updates exceeding the maximum time duration.

20. A non-transitory computer-readable medium storing code for software deployment at a compute container system, the code comprising instructions executable by a processor to:
identify a declarative deployment file that defines a deployment configuration for a plurality of logical single tenant system stacks supported by the compute container system, the deployment configuration comprising at least a set of deployment criteria and a failure threshold;
determine, based at least in part on the set of deployment criteria, a set of deployment groups for implementing one or more system updates, the set of deployment groups comprising at least a first deployment group, the first deployment group comprising a first set of logical single tenant system stacks from the plurality of logical single tenant system stacks; and
implement the one or more system updates for the set of deployment groups based at least in part on the failure threshold.

* * * * *